(12) United States Patent
Okano et al.

(10) Patent No.: US 11,593,930 B2
(45) Date of Patent: Feb. 28, 2023

(54) INSPECTION APPARATUS, INSPECTION METHOD AND STORAGE MEDIUM THAT DETECTS DEFECTS IN IMAGES

(71) Applicant: KABUSHIKI KAISHA TOSHIBA, Tokyo (JP)

(72) Inventors: Hideaki Okano, Yokohama Kanagawa (JP); Takeshi Morino, Yokohama Kanagawa (JP); Yoshinori Honguh, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 236 days.

(21) Appl. No.: 17/007,146

(22) Filed: Aug. 31, 2020

(65) Prior Publication Data
US 2021/0256676 A1 Aug. 19, 2021

(30) Foreign Application Priority Data
Feb. 14, 2020 (JP) .............................. JP2020-023538

(51) Int. Cl.
*G06T 7/00* (2017.01)
*G06T 7/11* (2017.01)
*G06V 10/75* (2022.01)

(52) U.S. Cl.
CPC ............. *G06T 7/001* (2013.01); *G06T 7/11* (2017.01); *G06V 10/758* (2022.01);
(Continued)

(58) Field of Classification Search
CPC . G06T 2207/30148; G06T 2207/10152; G06T 2207/10061; G06T 7/11; G06T 7/001; G06V 10/759; G06V 10/758
See application file for complete search history.

(56) References Cited

U.S. PATENT DOCUMENTS 6,411,377 B1 * 6/2002 Noguchi ................. H01J 37/00
356/237.4
6,868,175 B1 3/2005 Yamamoto et al.
(Continued)

FOREIGN PATENT DOCUMENTS

JP 2002-328094 A 11/2002
JP 2005-277395 A 10/2005
(Continued)

OTHER PUBLICATIONS

Howes, "Rainbow schlieren and its applications," Applied Optics (Jul. 15, 1984), 23:2449-60.
(Continued)

*Primary Examiner* — Mia M Thomas
(74) *Attorney, Agent, or Firm* — Finnegan, Henderson, Farabow, Garrett & Dunner, LLP

(57) ABSTRACT

An inspection apparatus including an image generation device which generates a second image corresponding to a first image, and a defect detection device which detects a defect in the second image. Each of the first and second image includes partial regions each including pixels. The defect detection device is configured to estimate a first value indicating a position difference between the first and second image for each of the partial regions, based on a luminance difference between the first and second image, estimate a second value indicating a reliability of the first value for each of the partial regions, and estimate a position difference between the first and second image for each of the pixels, based on the first and second value estimated for each of the partial regions.

17 Claims, 14 Drawing Sheets

(52) U.S. Cl.
CPC ............... *G06T 2207/10061* (2013.01); *G06T 2207/10152* (2013.01); *G06T 2207/30148* (2013.01); *G06V 10/759* (2022.01)

(56) References Cited

U.S. PATENT DOCUMENTS

| | | | | |
|---|---|---|---|---|
| 7,796,801 | B2* | 9/2010 | Kitamura | ............... G06T 7/0004 |
| | | | | 382/199 |
| 8,019,144 | B2 | 9/2011 | Sugihara | |
| 11,340,175 | B2* | 5/2022 | Klimmey | ................. G06T 7/001 |
| 2001/0053245 | A1* | 12/2001 | Sakai | ....................... G06T 7/32 |
| | | | | 382/218 |
| 2002/0181760 | A1* | 12/2002 | Asai | ..................... G06T 7/0002 |
| | | | | 382/149 |
| 2003/0021462 | A1* | 1/2003 | Sakai | ..................... G06T 7/001 |
| | | | | 382/145 |
| 2006/0002604 | A1* | 1/2006 | Sakai | ..................... G06T 7/001 |
| | | | | 382/141 |
| 2006/0018530 | A1 | 1/2006 | Oaki et al. | |
| 2006/0215900 | A1 | 9/2006 | Oaki et al. | |
| 2007/0121106 | A1* | 5/2007 | Shibata | ............... G01N 21/8806 |
| | | | | 356/237.2 |
| 2008/0130982 | A1* | 6/2008 | Kitamura | ................. G06T 7/001 |
| | | | | 382/144 |
| 2008/0144922 | A1* | 6/2008 | Naiki | ................... G06V 10/245 |
| | | | | 382/145 |
| 2009/0257647 | A1* | 10/2009 | Yoshitake | ............. G06T 7/0004 |
| | | | | 348/308 |
| 2013/0294677 | A1* | 11/2013 | Urano | .................. G01N 21/956 |
| | | | | 382/141 |
| 2013/0322737 | A1 | 12/2013 | Murakami et al. | |
| 2015/0356727 | A1* | 12/2015 | Urano | ................... G06T 7/0008 |
| | | | | 382/149 |
| 2017/0186144 | A1 | 6/2017 | Chien et al. | |
| 2017/0230577 | A1* | 8/2017 | Ishii | ....................... G06T 5/007 |
| 2017/0343695 | A1* | 11/2017 | Stetson | ................ G01R 33/032 |
| 2018/0266968 | A1* | 9/2018 | Hirai | ....................... G06T 7/001 |
| 2019/0174013 | A1* | 6/2019 | Yamanaka | ......... H04N 1/00037 |
| 2019/0219501 | A1 | 7/2019 | Ohno et al. | |
| 2019/0279349 | A1 | 9/2019 | Morino et al. | |
| 2020/0025690 | A1* | 1/2020 | Koshihara | ............ G06V 10/758 |
| 2021/0262944 | A1* | 8/2021 | Juschkin | ............. G01N 21/8851 |
| 2021/0272256 | A1* | 9/2021 | Okano | .................... G06T 7/001 |
| 2021/0304384 | A1* | 9/2021 | Nakada | .............. H04N 1/00087 |

FOREIGN PATENT DOCUMENTS

| | | |
|---|---|---|
| JP | 2006-30518 A | 2/2006 |
| JP | 3965189 B2 | 8/2007 |
| JP | 4101489 B2 | 6/2008 |
| JP | 2008-209726 A | 9/2008 |
| JP | 2009-198440 A | 9/2009 |
| JP | 2010-251168 A | 11/2010 |
| JP | 5771561 B2 | 9/2015 |
| JP | 2019-124542 A | 7/2019 |
| JP | 2019-158405 A | 9/2019 |

OTHER PUBLICATIONS

Kim et al., "Multiaperture telecentric lens for 3D reconstruction," Optics Letters (Apr. 1, 2011), 36:1050-52.

* cited by examiner

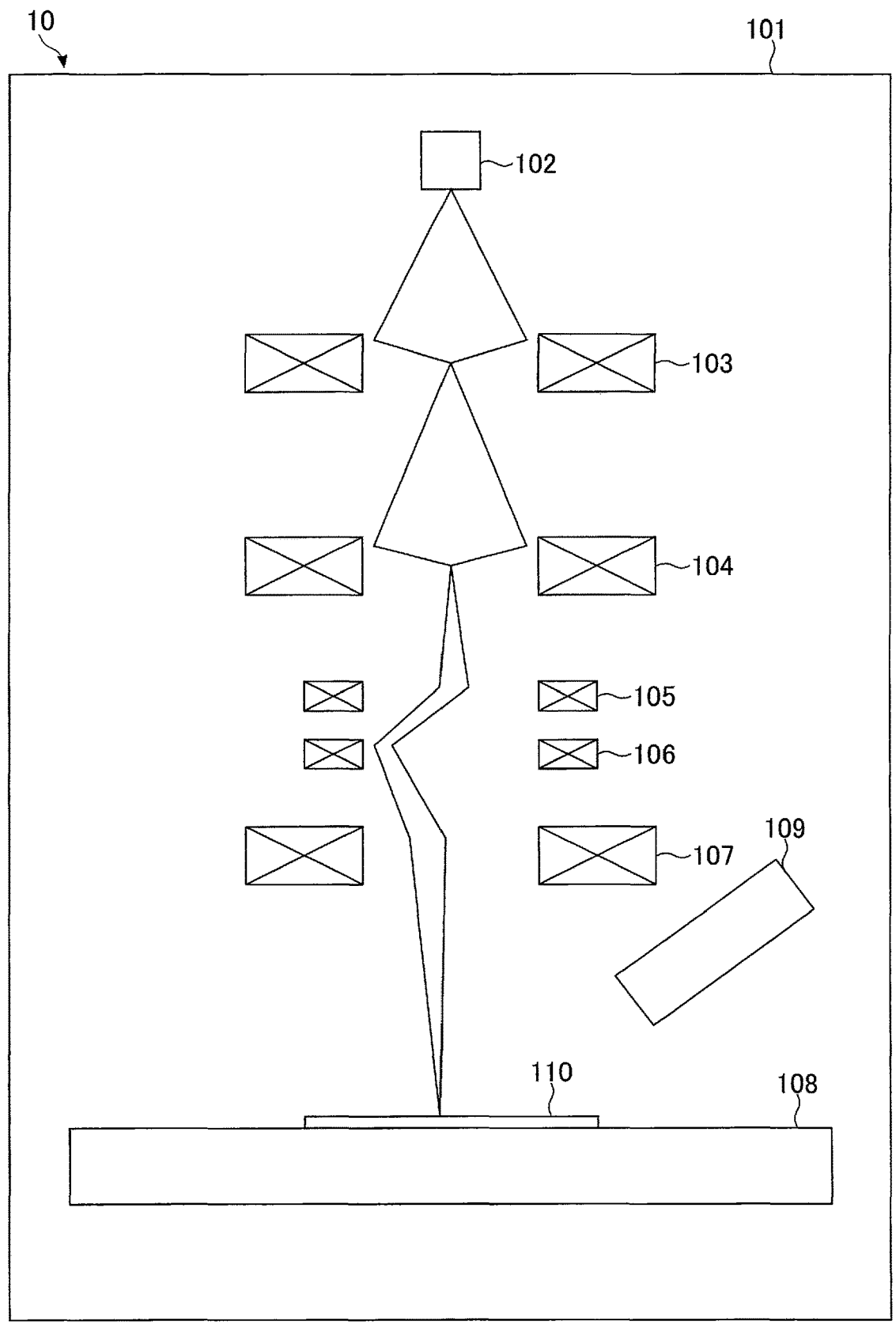
F I G. 2

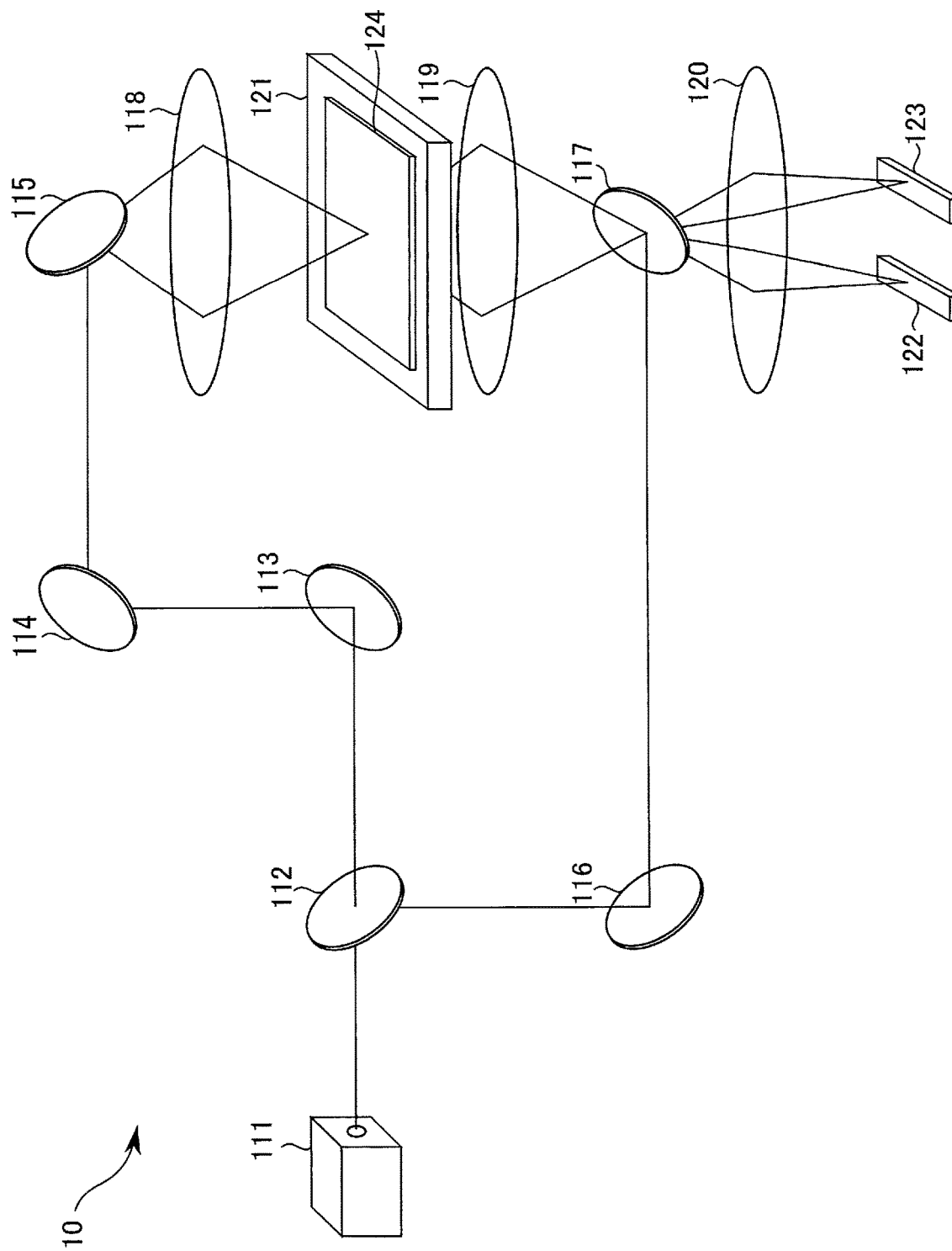
F I G. 15

INSPECTION APPARATUS, INSPECTION METHOD AND STORAGE MEDIUM THAT DETECTS DEFECTS IN IMAGES

CROSS-REFERENCE TO RELATED APPLICATIONS

This application is based upon and claims the benefit of priority from Japanese Patent Application No. 2020-023538, filed Feb. 14, 2020, the entire contents of which are incorporated herein by reference.

FIELD

An embodiment of the present invention relates to an inspection apparatus capable of detecting a defect in a mask used in manufacturing a semiconductor device.

BACKGROUND

In inspection of a circuit pattern provided on a semiconductor device, a process of comparing and computing an image to be inspected, which has been actually acquired, with a reference image, which is used as a reference based on which it is evaluated whether or not the circuit pattern is in the correct state, is performed, thereby generating a differential image between them. If no defect exists in the image to be inspected, the differential image will be a flat image with a substantially constant tone. If a defect exists, a pattern that shows a notable light-dark change with respect to its surroundings appears at the same position as that of the defect in the differential image.

Owing to a cause that is unavoidable in principle, the environment during inspection, etc., a position gap and spatial distortion exist in an image to be inspected. In such a case, a pattern called a false defect that exhibits a notable light-dark change with respect to its surroundings, even though it is not actually a defect, may occur in the differential image generated in the above manner.

To suppress erroneous defect detection due to a false defect, various schemes have been proposed for measuring and estimating a position gap and distortion based on comparison of a circuit pattern. However, in a region in which the circuit pattern is sparse, the position gap and the spatial distortion may not be estimated with a high precision.

BRIEF DESCRIPTION OF THE DRAWINGS

FIG. 2 is a schematic diagram illustrating an example of a hardware configuration of a real image data generation device of the inspection apparatus according to the first embodiment.

FIG. 15 is a schematic diagram illustrating an example of a hardware configuration of a real image data generation device of an inspection apparatus according to a modification.

DETAILED DESCRIPTION

Figure 1:
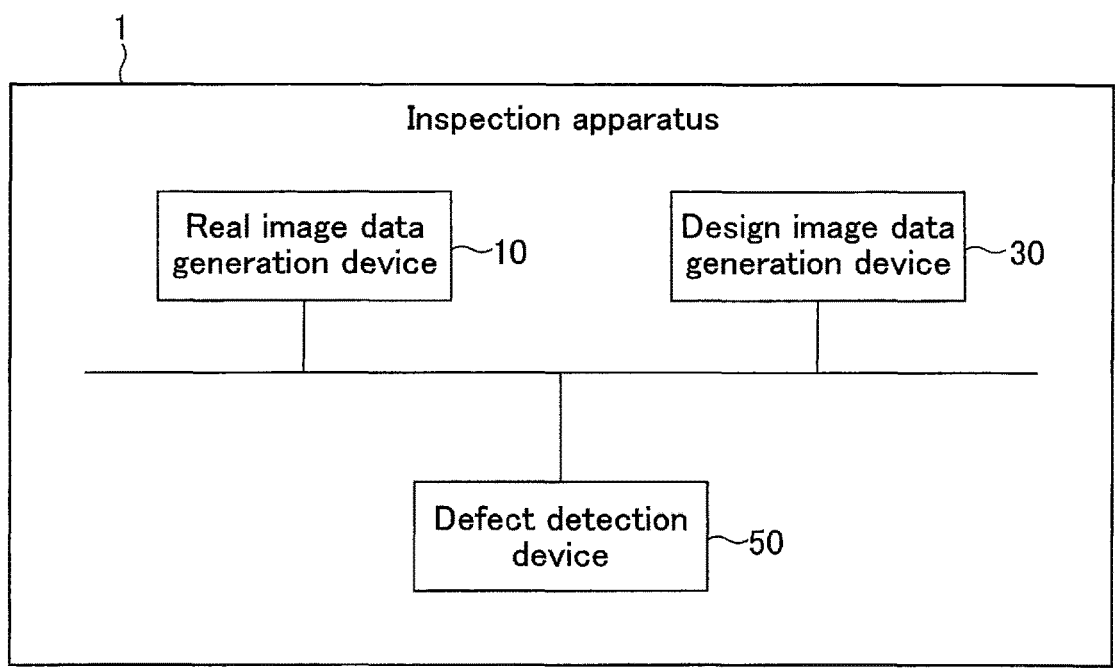
FIG. 1 is a block diagram illustrating an example of an overall configuration of an inspection apparatus according to a first embodiment.

In general, according to one embodiment, an inspection apparatus includes an image generation device which generates a second image corresponding to a first image; and a defect detection device which detects a defect in the second image with respect to the first image. Each of the first image and the second image includes a plurality of partial regions each including a plurality of pixels. The defect detection device is configured to: estimate a first value indicating a position difference between the first image and the second image for each of the partial regions, based on a luminance difference between the first image and the second image, estimate a second value indicating a reliability of the first value for each of the partial regions, and estimate a position difference between the first image and the second image for each of the pixels, based on the first value and the second value estimated for each of the partial regions.

Hereinafter, embodiments will be described with reference to the accompanying drawings. In the description that follows, components having the same function and configuration will be denoted by a common reference numeral.

1. First Embodiment

An inspection apparatus according to a first embodiment will be described.

The inspection apparatus according to the first embodiment includes, for example, a defect inspection device that inspects a defect in a semiconductor device. The semiconductor device includes, for example, a semiconductor memory device such as a NAND flash memory.

1.1 Hardware Configuration

A hardware configuration of the inspection apparatus according to the first embodiment will be described.

1.1.1 Overall Configuration

An overall configuration of the inspection apparatus according to the first embodiment will be described.

FIG. 1 is a block diagram showing an example of an overall configuration of the inspection apparatus according to the first embodiment. As shown in FIG. 1, the inspection apparatus 1 includes a real image data generation device 10, a design image data generation device 30, and a defect detection device 50.

The real image data generation device 10 functions as, for example, a scanning electron microscope (SEM) capable of generating an electronic image of a pattern transferred onto a semiconductor device (not illustrated) as real image data. The real image data generation device 10 transmits the generated real image data to the defect detection device 50.

The design image data generation device 30 has a function of generating, based on design data of the pattern transferred onto the semiconductor device, design image data of the pattern. The design data is, for example, stored in the design image data generation device 30 in a format such as computer-aided design (CAD) data. The design image data generation device 30 converts the design data into a data format (design image data) that is applicable to a defect detection process in the defect detection device 50, and then transmits the design image data to the defect detection device 50.

The defect detection device 50 receives the real image data from the real image data generation device 10, and the design image data from the design image data generation device 30. The defect detection device 50 regards a pair of real-image data items generated for the same pattern or a pair of real image data and design image data as a pair of image-to-be-inspected data and reference image data. The image-to-be-inspected data is image data to be a target of defect detection. The reference image data is image data that is used as a reference based on which defect detection is performed on image-to-be-inspected data. The defect detection device 50 detects a defect present in the image-to-be-inspected data by comparing the image-to-be-inspected data and the reference image data corresponding to the image-to-be-inspected data. Based on the defect detected in the image-to-be-inspected data, the defect detection device 50 specifies a defect present in the pattern.

1.1.2 Hardware Configuration of Real Image Data Generation Device

Next, a hardware configuration of the real image data generation device of the inspection apparatus according to the first embodiment will be described.

FIG. 2 is a schematic diagram illustrating a hardware configuration of the real image data generation device according to the first embodiment. FIG. 2 schematically shows a hardware configuration of an SEM as an example of the real image data generation device 10.

As shown in FIG. 2, the real image data generation device 10 includes, for example, an electron source 102, a plurality of condenser lenses 103 and 104, a plurality of scanning coils 105 and 106, an objective lens 107, a stage 108, and a sensor 109, which are stored in a chamber 101.

An electron beam emitted by the electron source 102 is accelerated and then focused by the condenser lenses 103 and 104 and the objective lens 107 onto a surface of the semiconductor device 110 mounted on the stage 108 as an electron spot. The scanning coils 105 and 106 control the position of the electron spot on the semiconductor device 110.

The sensor 109 detects, for example, electrons reflected from the semiconductor device 110. The real image data generation device 10 processes the detected electrons in an unillustrated processor, and generates real image data of the pattern on the semiconductor device 110 (i.e., an electronic image of the semiconductor device 110 on which a pattern is transferred with an unillustrated mask). The generated real image data is transmitted to the defect detection device 50.

As described above, the real image data generated by the real image data generation device 10 may be used either as image-to-be-inspected data or as reference image data in the defect detection device 50. That is, when a comparison is made for the same pattern, a pair of real-image data items generated for the same pattern may be regarded as a pair of image-to-be-inspected data and reference data. Such a method of using real image data is also referred to as a die-to-die database (DD) comparison. On the other hand, when a pattern formed by a mask and a pattern on design data is compared, a pair of real image data generated by the real image data generation device 10 and design image data generated by the design image data generation device 30 may be regarded as a pair of image-to-be-inspected data and reference data. Such a method of using real image data and design image data is also referred to as a die-to-database (DB) comparison.

1.1.3 Hardware Configuration of Defect Detection Device

Figure 3:
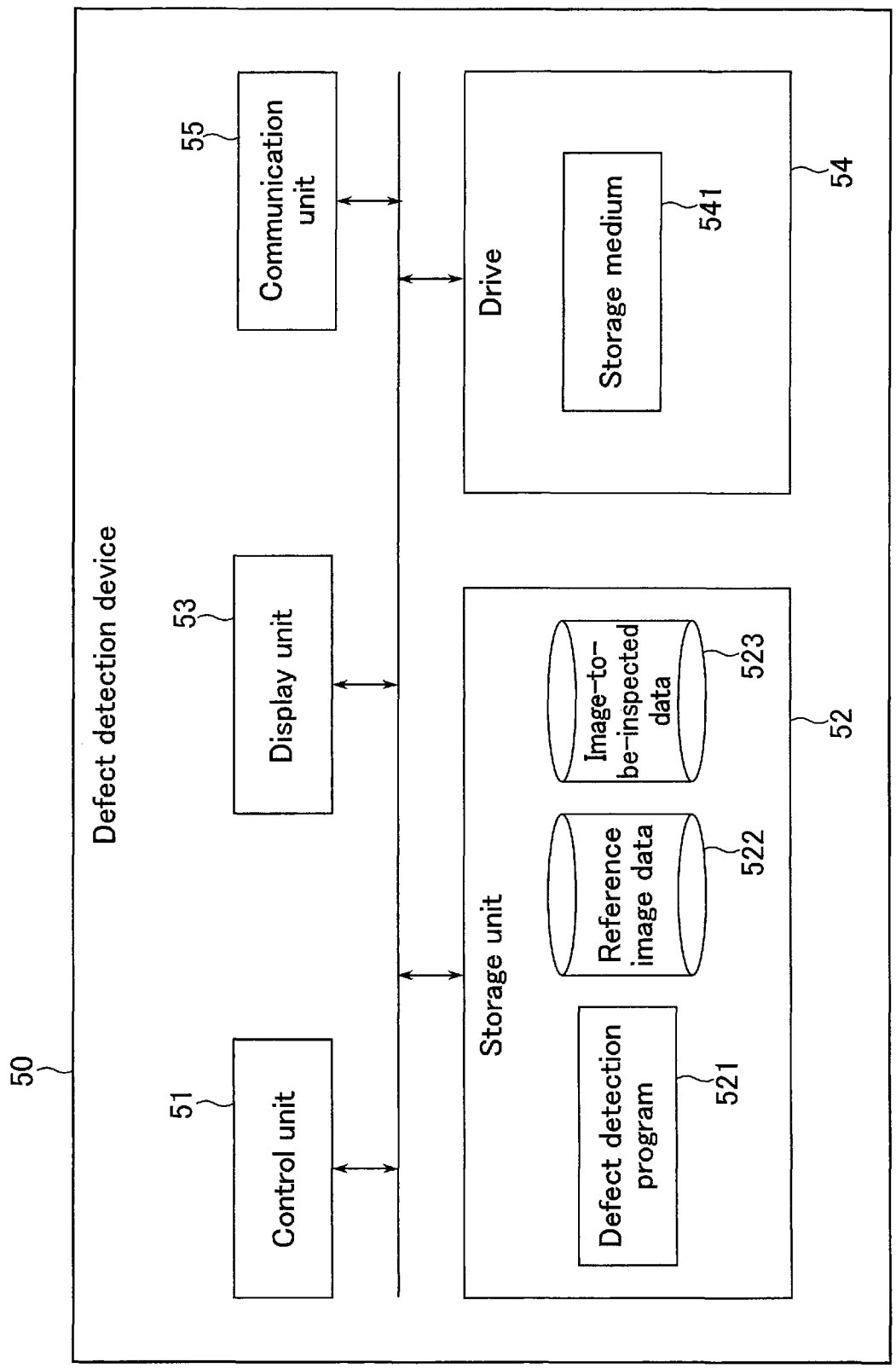
FIG. 3 is a block diagram illustrating an example of a hardware configuration of a defect detection device of the inspection apparatus according to the first embodiment.

Next, a hardware configuration of the defect detection device of the inspection apparatus according to the first embodiment will be described. FIG. 3 is a block diagram illustrating a hardware configuration of the defect detection device of the inspection apparatus according to the first embodiment.

As shown in FIG. 3, the defect detection device 50 includes a control unit 51, a storage unit 52, a display unit 53, a drive 54, and a communication unit 55.

The control unit 51 includes a central processing unit (CPU), a random access memory (RAM), a read-only memory (ROM), etc., and controls the entire operation of the defect detection device 50.

The storage unit 52 is, for example, an auxiliary storage device such as a hard disk drive (HDD), a solid state drive (SSD), etc. The storage unit 52 stores a defect detection program 521 to be executed by the defect detection device 50. The storage unit 52 stores, for example, reference image data 522 and image-to-be-inspected data 523 as input information necessary for executing the defect detection program 521.

The defect detection program 521 is a program for causing the defect detection device 50 to execute a defect detection process of detecting, from the image-to-be-inspected data 523, a point that is significantly different from the reference image data 522. Details of the defect detection process will be described later.

The display unit 53 includes, for example, a display screen (e.g., a liquid crystal display (LCD) or an electroluminescent (EL) display). The display unit 53 outputs a result of the execution of the defect detection program 521 executed by the control unit 51 to the user.

The drive 54 is a device for reading a program stored in the storage medium 541, such as a compact disk (CD) drive, a digital versatile disk (DVD) drive, etc. The type of the drive 54 may be suitably selected according to the type of the storage medium 541. The defect detection program 521 may be stored in the storage medium 541.

The storage medium 541 is a medium that accumulates information such as a recorded program by an electronic, magnetic, optical, mechanical, or chemical reaction such that the information on the program can be read by a computer or other devices, machines, etc. The defect detection device 50 may acquire the defect detection program 521 from the storage medium 541.

The communication unit 55 is a communication interface that manages communications between the defect detection device 50 and an exterior portion including the real image data generation device 10 and the design image data generation device 30. The communication unit 55 receives, for example, real image data and design image data from the exterior portion and stores them in the storage unit 52. The communication unit 55 outputs a result of comparison generated as a result of the execution of the defect detection program 521 to the exterior portion.

1.2 Functional Configuration

Next, a functional configuration of the inspection apparatus according to the first embodiment will be described.

1.2.1 Functional Configuration of Defect Detection Device

A functional configuration of the defect detection device of the inspection apparatus according to the first embodiment will be described.

The control unit 51 of the defect detection device 50 loads, for example, the defect detection program 521 stored in the storage unit 52 into a RAM. The control unit 51 causes the CPU to interpret and execute the defect detection program 521 loaded into the RAM, and controls the constituent elements.

Figure 4:
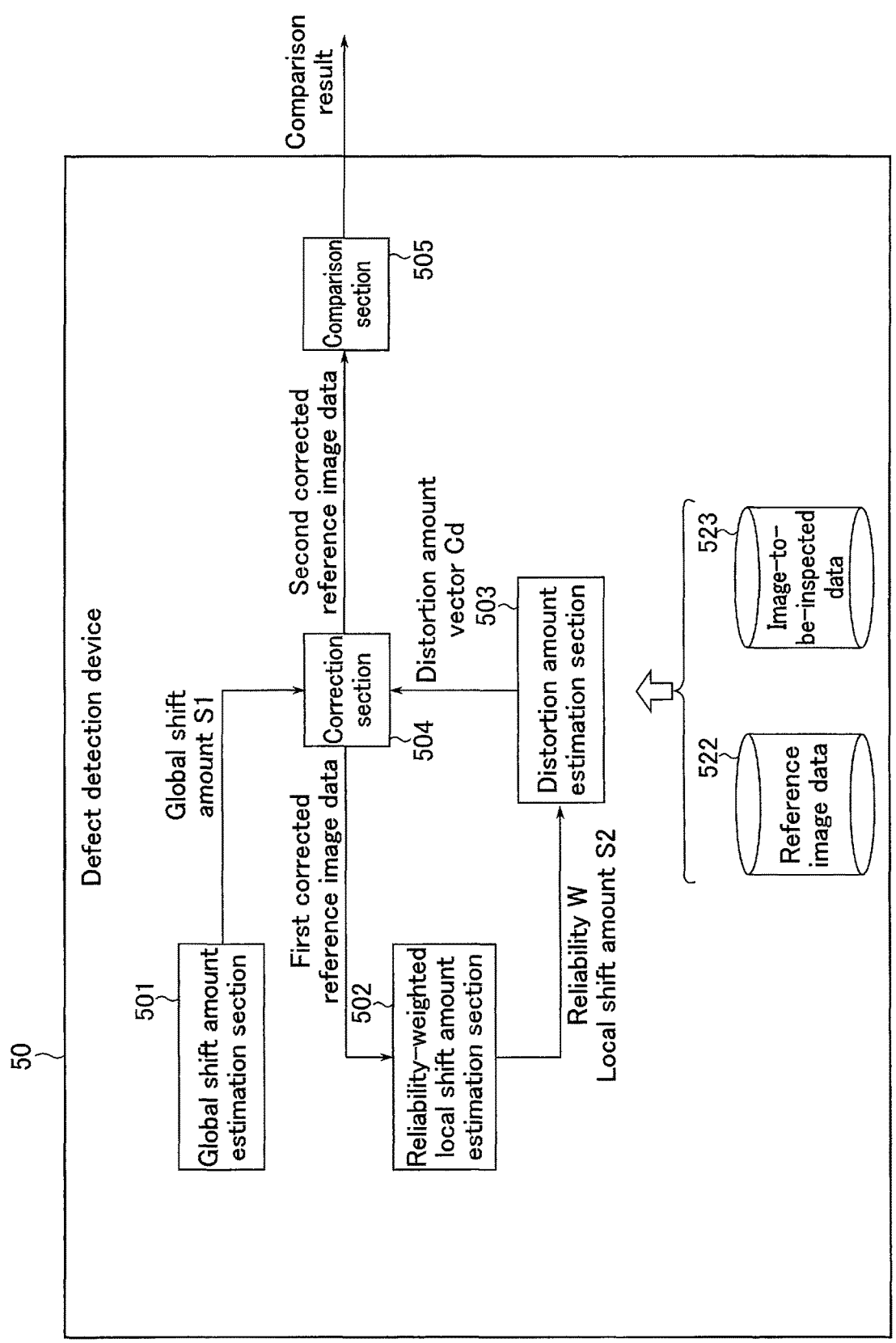
FIG. 4 is a block diagram illustrating an example of a functional configuration of the defect detection device of the inspection apparatus according to the first embodiment.

FIG. 4 is a block diagram illustrating part of a functional configuration of the defect detection device of the inspection apparatus according to the first embodiment that is related to a defect detection process.

As shown in FIG. 4, the defect detection device 50 functions as a computer that includes a global shift amount estimation section 501, a reliability-weighted local shift amount estimation section 502, a distortion amount estimation section 503, a correction section 504, and a comparison section 505 when a defect detection process is executed based on the reference image data 522 and the image-to-be-inspected data 523. In the description that follows, let us assume that each of the reference image data 522 and the image-to-be-inspected data 523 is a set of luminance values of pixels arranged in an XY plane configured of an X-axis and a Y-axis that intersect each other. More specifically, a luminance value at coordinates (x, y) of the reference image data 522 is represented as IR (x, y), and a luminance value at coordinates (x, y) of the image-to-be-inspected data 523 is represented as IS (x, y).

The global shift amount estimation section 501 and the reliability-weighted local shift amount estimation section 502 have a function of estimating a shift amount S at which an error between the two items of image data is minimized. More specifically, the global shift amount estimation section 501 and the reliability-weighted local shift amount estimation section 502 calculate an evaluation value E based on, for example, the following formula (1):

$$E(s_x, s_y) = \Sigma_{j=0}^{N-1} \Sigma_{i=0}^{N-1} (I_s(i-s_x, j-s_y) - I_R(i,j))^2 \quad (1)$$

Here, let us assume that the range of evaluation of the two items of image data is a range configured of N×N pixels (0≤x, y≤N−1).

The global shift amount estimation section 501 and the reliability-weighted local shift amount estimation section 502 estimate a shift amount $S=(s_x, s_y)$ at which the calculated evaluation value E is minimized. Thereby, a shift amount S is estimated at which, when one of the items of image data is shifted to the other item of image data, the luminance difference between the two items of image data is minimized over their entire evaluation ranges. Such a linear matching technique between two items of image data is referred to as sum of squared differences (SSD) matching. As will be described below, a shift amount S includes, for example, a global shift amount S1 and local shift amounts S2.

The global shift amount estimation section 501 estimates a global shift amount $S1=(s1_x, s1_y)$ by applying the SSD matching to the entirety of the reference image data 522 and the image-to-be-inspected data 523. The global shift amount estimation section 501 transmits the global shift amount S1 to the correction section 504.

The reliability-weighted local shift amount estimation section 502 estimates local shift amounts S2 by applying the SSD matching to partial regions included in the image-to-be-inspected data 523 and the first corrected reference image data received from the correction section 504. For example, the reliability-weighted local shift amount estimation section 502 equally divides the first corrected reference image data and the image-to-be-inspected data 523 into M partial regions, and applies SSD matching to the partial regions of each pair of the first corrected reference image data and the image-to-be-inspected data 523 (where M is a natural number). Thereby, the reliability-weighted local shift amount estimation section 502 estimates M local shift amounts S2 ($S2_1=(s2_{x1}, s2_{y1})$, $S2_2=(S2_{x2}, s2_{y2})$, . . . , and $S2_M=(s2_{xM}, s2_{yM})$). The reliability-weighted local shift amount estimation section 502 transmits the local shift amounts S2 to the distortion amount estimation section 503.

In estimating the local shift amounts S2, the reliability-weighted local shift amount estimation section 502 further estimates M reliabilities w ($w_1, w_2, \ldots,$ and $w_M$) corresponding to the M local shift amounts S2. The reliability-weighted local shift amount estimation section 502 transmits the reliabilities w, together with the local shift amounts S2, to the distortion amount estimation section 503. The reliability w is, for example, a real number equal to or greater than 0 and equal to or lower than 1 (where 0≤w≤1), and indicates a relative likelihood of the M local shift amounts S2. That is, a local shift amount S2 that is associated with a reliability w closer to 1 is regarded as more likely to be the correct shift amount, and a local shift amount S2 that is associated with a reliability w closer to 0 is less likely to be the correct shift amount. The reliability w can be rephrased as a weighting coefficient w for determining the weight of the corresponding local shift amount S2.

Based on the M local shift amounts S2 and the M reliabilities w received from the reliability-weighted local shift amount estimation section 502, the distortion amount estimation section 503 estimates a distortion amount vector Cd. The distortion amount vector $C_d$ expresses, in a vector format, a coefficient of a distortion amount d between positions of corresponding pixels of the two items of image data expressed in a polynomial equation of a given degree. Specifically, when, for example, a distortion amount d is expressed in a polynomial of degree 2, the distortion amount vector $C_d$ is expressed as a column vector consisting of six coefficients ($c_{d1}$, $c_{d2}$, $c_{d3}$, $c_{d4}$, $c_{d5}$, and $c_{d6}$). In this case, a distortion amount d=($d_x$(x, y), $d_y$(x, y)) at the position of a pixel at a given position (x, y) in image data is calculated, using the coefficients $c_{d1}$ to $c_{d6}$, in accordance with the following formula (2):

$$d_x(x,y)=c_{dx1}x^2+c_{dx2}xy+c_{dx3}y^2+c_{dx4}x+c_{dx5}y+c_{dx6}$$

$$d_y(x,y)=c_{dy1}x^2+c_{dy2}xy+c_{dy3}y^2+c_{dy4}x+c_{dy5}y+c_{dy6} \quad (2)$$

The distortion amount estimation section 503 transmits the estimated distortion amount vector Cd to the correction section 504. Details of the technique of estimating a distortion amount vector Cd will be described later.

Upon receiving the global shift amount S1 from the global shift amount estimation section 501, the correction section 504 applies the global shift amount S1 to the reference image data 522, and generates first corrected reference image data. The correction section 504 transmits the first corrected reference image data to the reliability-weighted local shift amount estimation section 502. Upon receiving the distortion amount vector $C_d$ from the distortion amount estimation section 503, the correction section 504 applies the distortion amount vector $C_d$ and the global shift amount S1 to the reference image data 522, and generates second corrected reference image data. The correction section 504 transmits the second corrected reference image data to the comparison section 505.

The correction section 504 may remap (rearrange) the first corrected reference image data and the second corrected reference image data in such a manner that they become image data of an integer grid. The remapping technique is not limited to forward-direction remapping, and reverse-direction remapping may be applicable. The forward-direction remapping is a technique of, for example, converting corrected reference image data from a real grid to an integer grid. The reverse-direction remapping is a technique of obtaining a real luminance value from not-yet-corrected reference image data of an integer grid by interpolation, and converting it to corrected reference image data of an integer grid. The reverse-direction remapping is capable of reducing quantization errors, compared to the forward-direction remapping, while reducing the computation amount to be as small as that of the forward-direction remapping.

Upon receiving the second corrected reference image data and the image-to-be-inspected data 523 from the correction section 504, the comparison section 505 compares the second corrected reference image data with the image-to-be-inspected data 523, and presents the comparison result to the user. More specifically, the comparison section 505 maps, for example, pixel-by-pixel differences in luminance value between the second corrected reference image data and the image-to-be-inspected data 523 onto an XY plane, and extracts a point where the difference in luminance value is larger than a predetermined threshold value as a defect portion. The comparison section 505 presents, to the user, image data of the differences in luminance value mapped onto the XY plane, along with the extracted defect portion, as a comparison result.

Prior to the estimation process of the global shift amount S1 by the global shift amount estimation section 501 or the estimation process of the local shift amounts S2 and the reliabilities w by the reliability-weighted local shift amount estimation section 502, a pre-estimation process may be performed on the reference image data 522 and the image-to-be-inspected data 523, even though such a process is omitted in FIG. 4. The pre-estimation process primarily functions as, for example, a noise filter that reduces noise included in the two items of image data. Specifically, a Gaussian blur process, for example, is applicable as a pre-estimation process.

Prior to the comparison process by the comparison section 505, a pre-comparison process may be performed on the reference image data 522 and the image-to-be-inspected data 523, even though such a process is omitted in FIG. 4. The pre-comparison process primarily functions as, for example, a noise filter that reduces noise included in two items of image data, similarly to the pre-estimation process. Specifically, a non-local means (NLM) process, for example, is applicable as the pre-comparison process. A noise reduction process that is applicable to a pre-estimation process (e.g., a Gaussian blur process) and a noise reduction process that is applicable to a pre-comparison process (e.g., an NLM process) are not applied in an overlapping manner.

1.2 Operation

Next, an operation of an inspection apparatus according to the first embodiment will be described.

1.2.1 Overall Operation of Inspection Apparatus

First, an overall operation of an inspection apparatus according to the first embodiment will be described.

Figure 5:
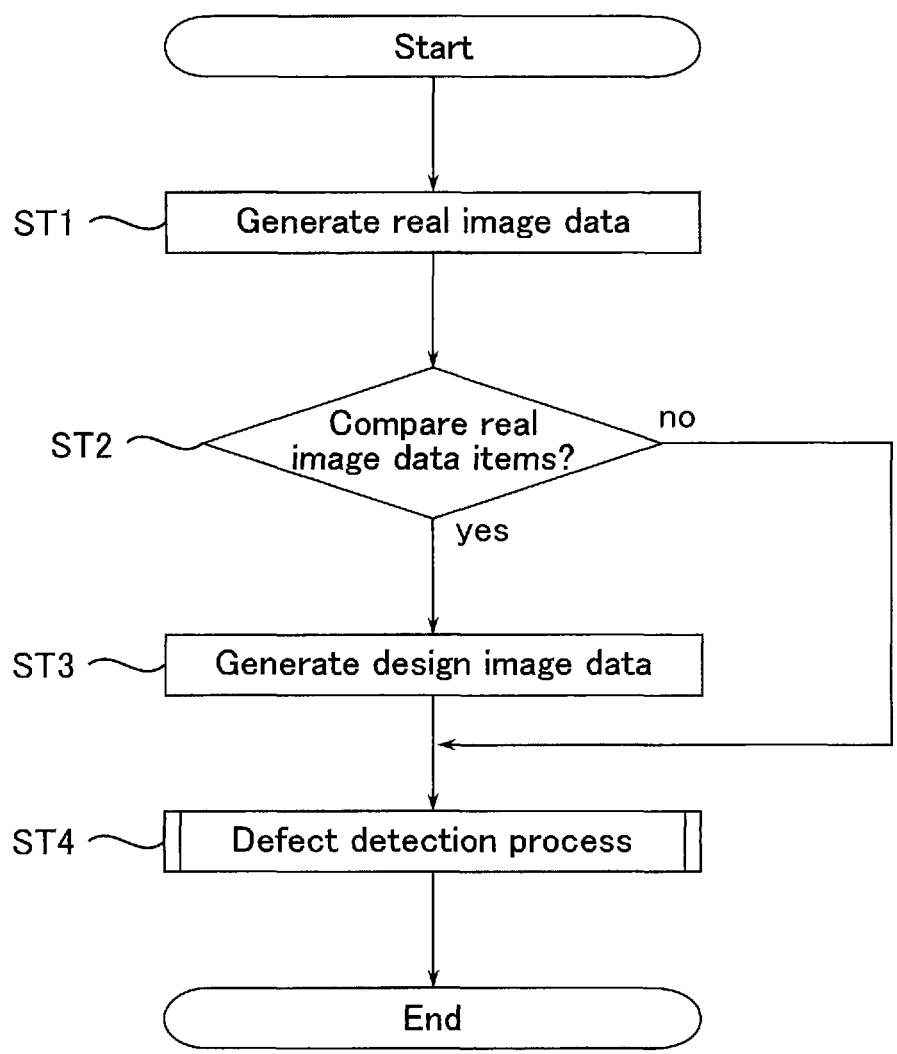
FIG. 5 is a flowchart illustrating an example of an overall operation of the inspection apparatus according to the first embodiment.

FIG. 5 is a flowchart illustrating an overall operation of the inspection apparatus according to the first embodiment. As shown in FIG. 5, the inspection apparatus 1 is compatible with either the DD comparison or the DB comparison.

At step ST1, the real image data generation device 10 generates real image data of a pattern transferred onto the semiconductor device 110 by mounting the semiconductor device 110 targeted for inspection on the stage 108 and emitting an electron beam from the electron source 102. The real image data generation device 10 transmits the generated real image data to the defect detection device 50.

At step ST2, the inspection apparatus 1 determines whether or not the pattern inspection method is a DD comparison or a DB comparison. When a DD comparison is performed, namely, when real-image data items are compared (yes in step ST2), the processing advances to step ST3. On the other hand, when a DB comparison is performed, namely, when real-image data items are not compared (no in step ST2), the processing advances to step ST4, without performing step ST3.

At step ST3, the design image data generation device 30 generates design image data based on design data of a pattern targeted for inspection. The design image data generation device 30 transmits the generated design image data to the defect detection device 50.

At step ST4, when a DD comparison is performed, the defect detection device 50 stores the real image data generated at step ST1 as reference image data 522 and image-to-be-inspected data 523 in the storage unit 52, and performs a defect detection process. When a DB comparison is performed, the defect detection device 50 stores the real image data generated at step ST1 as image-to-be-inspected data 523 and stores the design image data generated at step ST3 as reference image data 522 in the storage unit 52, and performs a defect detection process.

This is the end of the overall operation.

1.2.2 Defect Detection Operation

Next, a defect detection operation included in the above-described overall operation of the inspection apparatus according to the first embodiment will be described.

1.2.2.1 Flowchart

Figure 6:
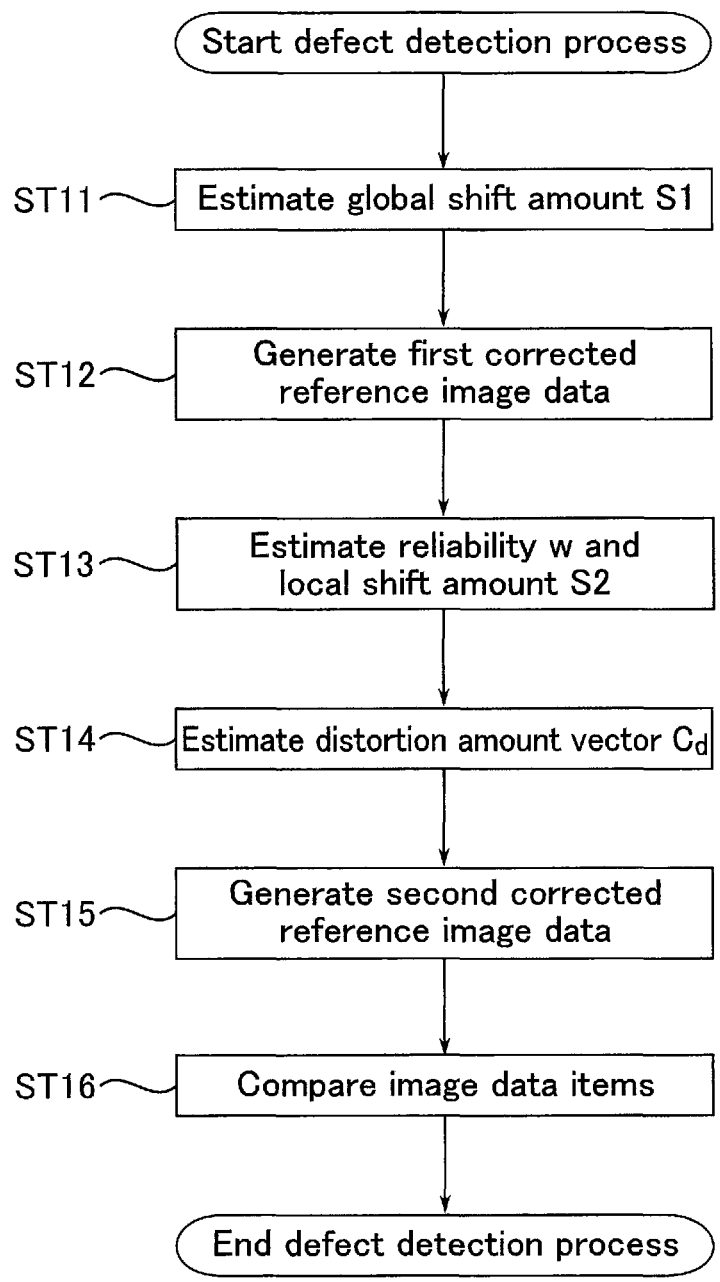
FIG. 6 is a flowchart illustrating an example of a defect detection operation in the defect detection device of the inspection apparatus according to the first embodiment.

A flowchart of a defect detection operation in the defect detection device according to the first embodiment will be described with reference to FIG. 6. FIG. 6 illustrates details of step ST4 shown in FIG. 5.

As shown in FIG. 6, at step ST11, the control unit 51, which functions as a global shift amount estimation section 501, executes SSD matching on the entirety of the reference image data 522 and the image-to-be-inspected data 523, and estimates a global shift amount S1. Prior to the estimation of the global shift amount S1, the control unit 51 may execute a pre-estimation process. Specifically, the control unit 51 may apply a Gaussian blur process to each of the reference image data 522 and the image-to-be-inspected data 523.

At step ST12, the control unit 51, which functions as a correction section 504, corrects the reference image data 522 based on the global shift amount S1 estimated at step ST11, and generates first corrected reference image data.

At step ST13, the control unit 51, which functions as a reliability-weighted local shift amount estimation section 502, divides the first corrected reference image data generated at step ST12 and the image-to-be-inspected data 523 into M partial regions. The control unit 51 performs SSD matching on each of the M partial regions, and estimates M local shift amounts S2 and M reliabilities w respectively corresponding to the M local shift amounts S2.

At step ST14, the control unit 51, which functions as a distortion amount estimation section 503, estimates a distortion amount vector $C_d$ of the entirety of the first corrected reference image data, based on the M local shift amounts S2 estimated at step ST13 and the M reliabilities w.

At step ST15, the control unit 51, which functions as a correction section 504, corrects the reference image data 522 based on the global shift amount S1 estimated at step ST12 and the distortion amount vector $C_d$ estimated at step ST14, and generates second corrected reference image data.

At step ST16, the control unit 51, which functions as a comparison section 505, compares the image-to-be-inspected data 523 and the second corrected reference image data generated at step ST15, and presents a result of the comparison to the user. Prior to the comparison process, the control unit 51 may execute a pre-comparison process. Specifically, the control unit 51 may apply an NLM process to each of the second corrected reference image data and the image-to-be-inspected data 523.

This is the end of the defect detection operation.

1.2.2.2 Correction Operation

Next, a correction operation included in the defect detection operation in the defect detection device according to the first embodiment will be described.

Figure 7:
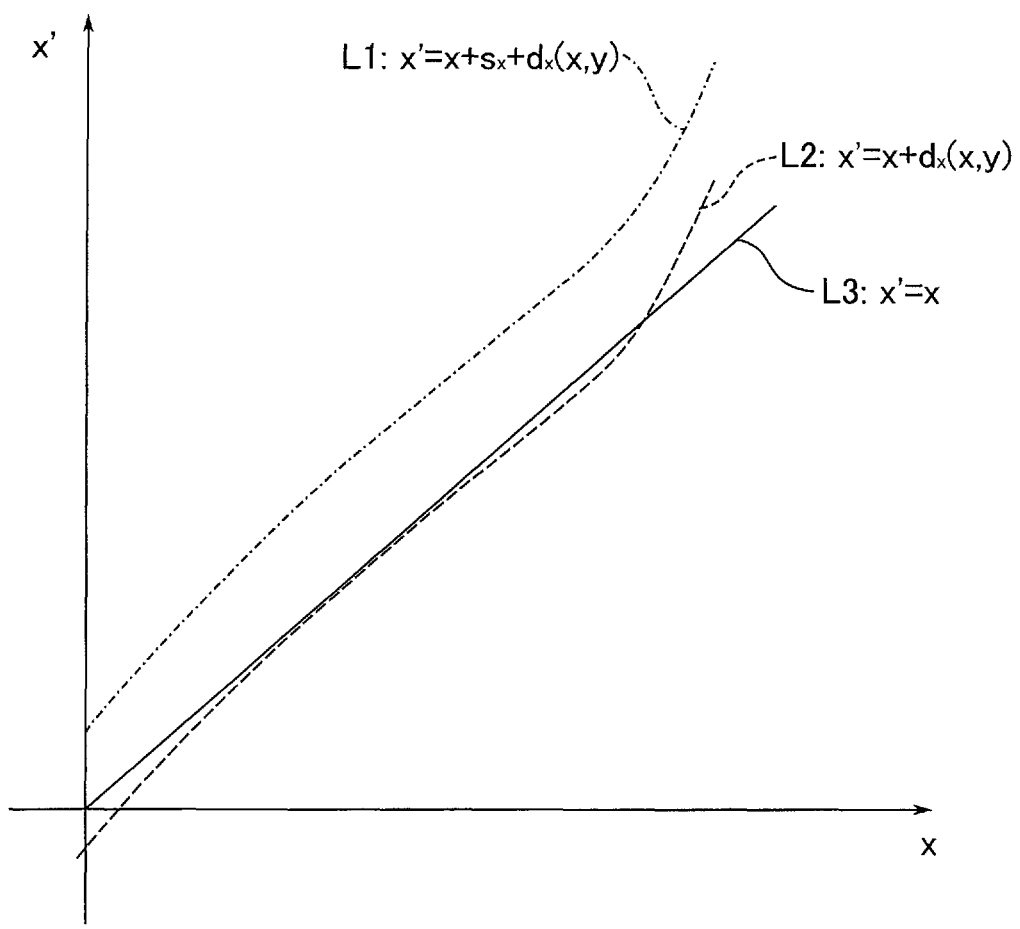
FIG. 7 is a diagram schematically illustrating an example of a correction operation in a defect detection device of the inspection apparatus according to the first embodiment.

FIG. 7 is a diagram schematically illustrating a correction operation of reference image data in the defect detection device according to the first embodiment. FIG. 7 corresponds to steps ST13 and ST16 illustrated in FIG. 6. FIG. 7 schematically shows, as an example, a position change of a pixel of the reference image data 522 before and after two corrections are executed one-dimensionally (with respect to the x-axis direction). In the example of FIG. 7, a position x of a pixel of the image-to-be-inspected data 523 is shown on the lateral axis, and a position x' of a pixel of the reference image data 522 corresponding to the image-to-be-inspected data 523 (containing the first corrected reference image data and the second corrected reference image data) is shown on the vertical axis.

As shown in FIG. 7, a position gap as shown by a line L1 may exist between the reference image data 522 and the image-to-be-inspected data 523 prior to the correction. That is, the cause of the position gap is roughly classified into a shift amount $s_x$ and a distortion amount $d_x(x, y)$, and the positions x and x' can be associated, using them as in the following formula (3):

$$x'=x+s_x+d_x(x,y) \quad (3)$$

Here, the shift amount $s_x$ indicates a shift amount that linearly occurs over the entire image data, regardless of the position of the pixel, and the distortion amount $d_x(x, y)$ indicates a shift amount (which is non-linear with respect to the position of the pixel) that occurs depending on the position of the pixel.

The correction section 504 generates first corrected reference image data by removing the shift amount $s_x$. That is, a distortion amount $d_x(x, y)$ may exist between the first corrected reference image data and the image-to-be-inspected data 523, as shown by the line L2.

The correction section 504 generates second corrected reference image data by further removing the distortion amount $d_x(x, y)$. By the removal of the shift amount $s_x$ and the distortion amount $d_x(x, y)$, the second corrected reference image data and the image-to-be-inspected data may completely match, with x'=x ideally, as shown by the line L3.

1.2.2.3 Reliability-Weighted Local Shift Amount Estimation Operation

Next, a reliability-weighted local shift amount estimation operation will be described.

Figure 8:
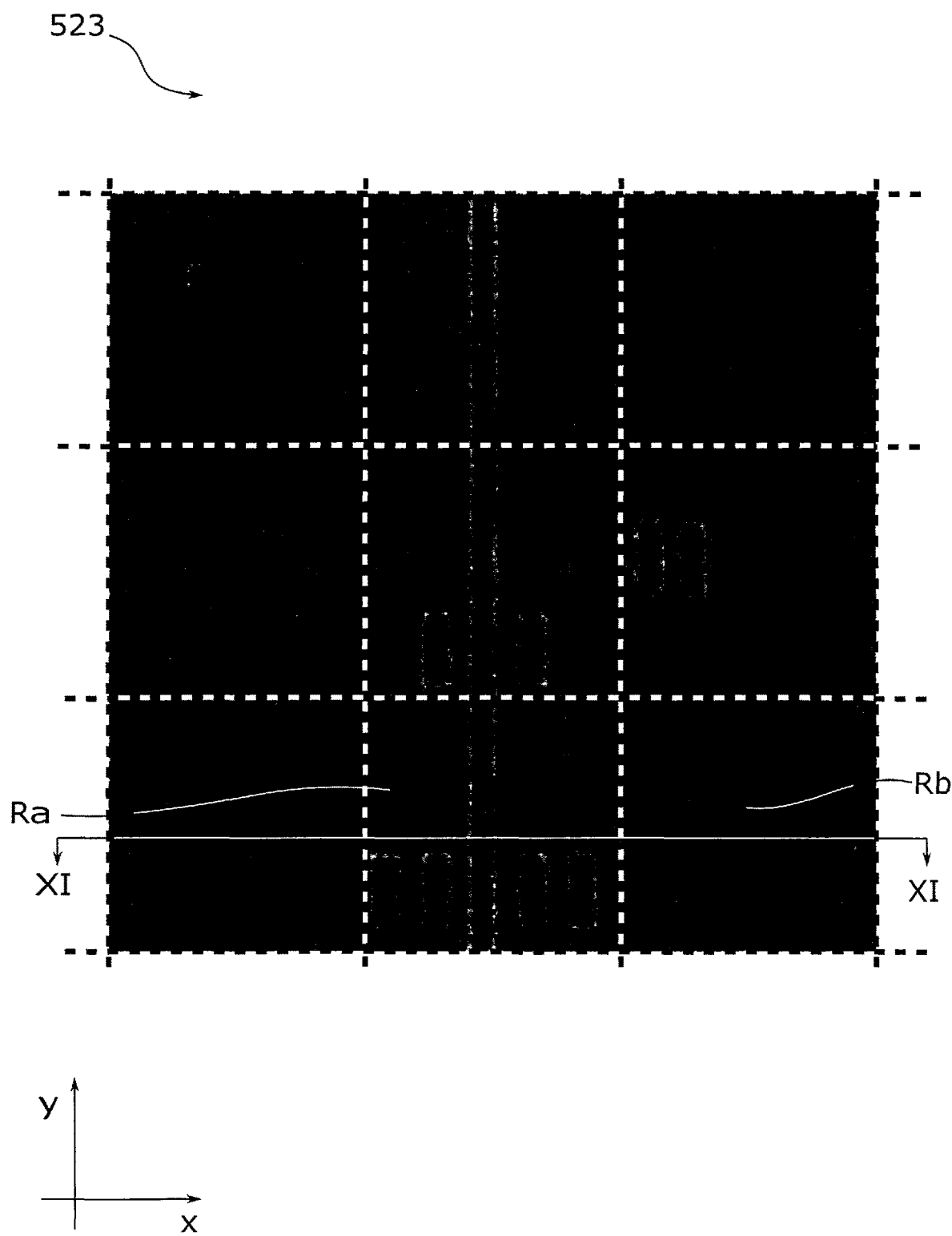
FIG. 8 is a schematic diagram illustrating an example of image-to-be-inspected data to which a reliability-weighted local shift amount estimation operation is applied in the defect detection device of the inspection apparatus according to the first embodiment.

FIG. 8 is a schematic diagram showing an example of image-to-be-inspected data to which a reliability-weighted local shift amount estimation operation in the defect detection device according to the first embodiment is applied.

As shown in FIG. 8, the image-to-be-inspected data 523 is SEM image data, and a circuit pattern may be locally disposed in the image. In this case, in a partial region Ra with a dense circuit pattern, for example, since many edges of the circuit pattern are included, it is relatively easy to accurately estimate a shift amount from the reference image data 522. On the other hand, in a partial region Rb with a sparse circuit pattern, only few edges of the circuit pattern are included. In an SEM image, much noise is contained in a region with no circuit pattern. Accordingly, in the partial region Rb, it is relatively difficult to accurately estimate a shift amount from the reference image data 522, and the estimated shift amount may contain many errors. Thus, when the image-to-be-inspected data 523 is divided into a plurality of partial regions, a partial region Ra in which an estimated shift amount from the reference image data 522 is more likely to be accurate, and a partial region Rb in which the estimated shift amount is less likely to be accurate may be generated, according to the distribution of the circuit pattern in the image-to-be-inspected data 523. In this case, it is preferable that a defect detection operation be performed by setting a high reliability for the partial region Ra compared to the partial region Rb, and assigning weights to the local shift amounts S2 according to the assigned reliability.

Figure 9:
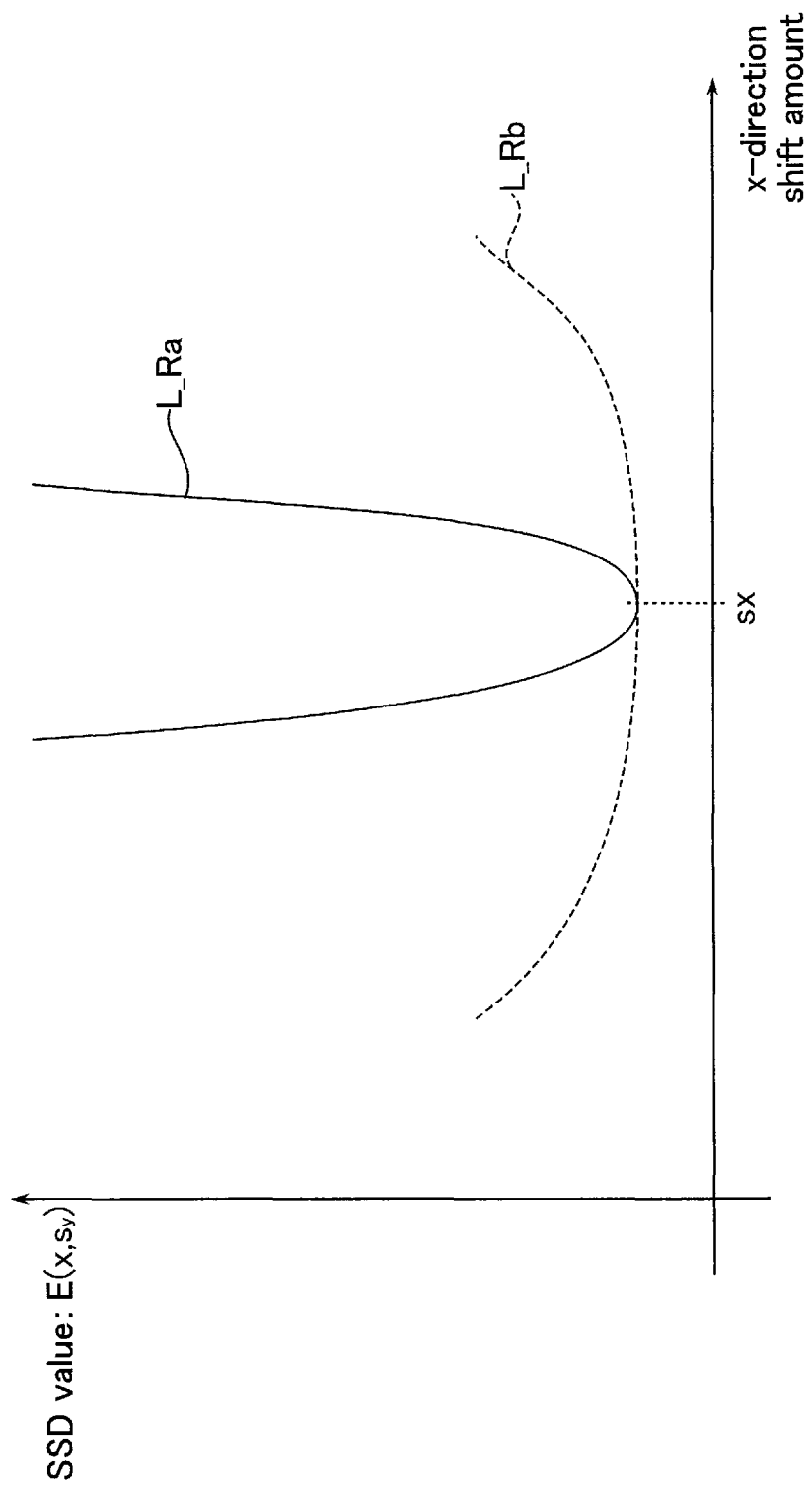
FIG. 9 is a diagram illustrating an example of a reliability estimation operation in the defect detection device of the inspection apparatus according to the first embodiment.

FIG. 9 is a diagram illustrating a reliability estimation operation in a defect detection device according to the first embodiment. FIG. 9 corresponds to step ST14 illustrated in FIG. 6. In FIG. 9, a shift of an evaluation value E (SSD value) by SSD matching in the vicinity of a true shift amount $(s_x, s_y)$ when the true shift amount $(s_x, s_y)$ is applied to each of the partial regions Ra and Rb is shown. More specifically, in FIG. 8, a shift of an SSD value corresponding to a partial region Ra with a high reliability in the vicinity of the true shift amount $(s_x, s_y)$ is shown as a line L_Ra, and a shift of an SSD value corresponding to a partial region Rb with a low reliability is shown as a line L_Rb. For convenience in explanation, in FIG. 9, the SSD value $E(x, s_y)$ is shown on the vertical axis, with its shift amount in the y direction fixed and its shift amount in the x direction taken on the lateral axis.

As shown in FIG. 9, the SSD value $E(x, s_y)$ takes a minimum value at the true shift amount $s_x$ in the x direction, and increases at an increasing distance from the true shift amount $s_x$. The SSD value $E(x, s_y)$ may be approximated by a quadratic function with an axis of symmetry at the true shift amount $s_x$.

In the partial region Ra, since the circuit pattern is dense, the SSD value increases at only a small distance from the true shift amount $s_x$ in the x direction. On the other hand, since the pattern is sparse in the partial region Rb, the difference from the reference image data 522 does not appear conspicuously at a small distance from the true shift amount $s_x$ in the x direction, and an amount of increase of the SSD value is smaller than a line L_Ra. Accordingly, the quadratic coefficient of the quadratic function approximated by the line L_Rb takes a value smaller than that of the quadratic coefficient of the quadratic function approximated by the line L_Ra.

In this manner, the quadratic coefficient obtained by approximating the SSD value $E(x, s_y)$ by a quadratic function may be relevant to the presence or absence of a pattern in each partial region, and can be used as a reliability w with respect to the x direction. Specifically, in estimating the local shift amounts S2, the reliability-weighted local shift amount estimation section 502 calculates a shift of the SSD value with respect to the shift amount in the x direction, as shown in FIG. 9, for each partial region, and approximates the shift by a quadratic function. The reliability-weighted local shift amount estimation section 502 extracts a quadratic coefficient of a quadratic function for each partial region, and normalizes the value of the quadratic coefficient in such a manner that the reliability of a partial region at which the quadratic coefficient is maximized becomes 1. Thereby, the reliability $w_x$ with respect to the x direction is estimated for each partial region.

The reliability $w_y$ with respect to the y direction can be estimated using the above-described approach, similarly to the reliability $w_x$ with respect to the x direction. That is, the reliability-weighted local shift amount estimation section 502 calculates a shift of the SSD value with respect to the shift amount in the y direction for each partial region, and approximates the shift by a quadratic function. The reliability-weighted local shift amount estimation section 502 extracts a quadratic coefficient of a quadratic function for each partial region, and normalizes the value of the quadratic coefficient in such a manner that the reliability of a partial region at which the quadratic coefficient is maximized becomes 1. Thereby, the reliability $w_y$ with respect to the y direction is estimated for each partial region.

Thereby, the reliability-weighted local shift amount estimation section 502 is capable of estimating, of a single local shift amount S2, a reliability $w_x$ with respect to the x direction and a reliability $w_y$ with respect to the y direction.

1.2.2.4 Distortion Amount Estimation Operation

Next, a distortion amount estimation operation will be described.

Figure 10:
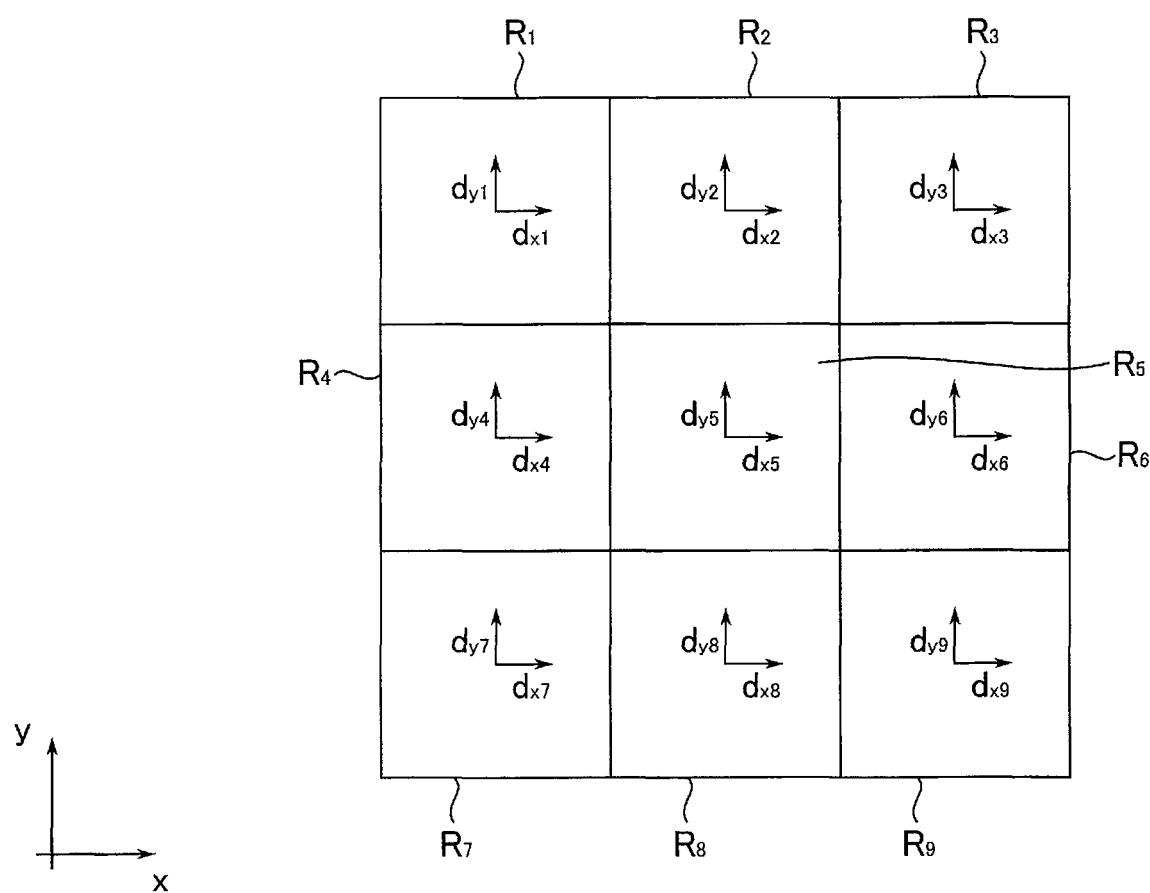
FIG. 10 is a schematic diagram illustrating an example of a distortion amount estimation operation in the defect detection device of the inspection apparatus according to the first embodiment.

FIG. 10 is a schematic diagram illustrating a distortion amount estimation operation in the defect detection device according to the first embodiment. In FIG. 10, a relationship between a representative distortion amount d of each partial region of the first corrected reference image data and a local shift amount S2 is schematically shown. In the example of FIG. 10, a case is shown where the first corrected reference image data is divided into M=9 partial regions $R_1$, $R_2$, ..., and $R_9$, and a local shift amount S2 $((s2_{x1}, s2_{y1}), (s2_{x2}, s2_{y2}), \ldots,$ and $(s2_{x9}, s2_{y9}))$ is estimated for each of the partial regions $R_1$ to $R_9$. Let us assume that the reliability $w((w_{x1}, w_{y1}), (w_{x2}, w_{y2}), \ldots, (w_{x9}, w_{y9}))$ is estimated for each of the partial regions $R_1$ to $R_9$, even though such a configuration is not illustrated.

As shown in FIG. 10, the distortion amount estimation section 503 regards the local shift amounts $(s2_{x1}, s2_{y1})$ to $(s2_{x9}, s2_{y9})$ as distortion amounts $(d_{x1}, d_{y1})$ to $(d_{x9}, d_{y9})$ at representative positions $(x_1, y_1)$ to $(x_9, y_9)$ of corresponding partial regions $R_1$ to $R_9$. That is, the distortion amount estimation section 503 assumes a correspondence relation between the distortion amounts $(d_{x1}, d_{y1})$ to $(d_{x9}, d_{y9})$ and the local shift amounts $(s2_{x1}, s2_{y1})$ to $(s2_{x9}, s2_{y9})$ as shown in the following formula (4):

$$\left.\begin{aligned} s2_{xk} &= d_{xk} \approx d_x(x_k, y_k) \\ s2_{yk} &= d_{yk} \approx d_y(x_k, y_k) \end{aligned}\right\}(1 \leq k \leq M) \quad (4)$$

As described above, in the first embodiment, it is assumed that the distortion amount d satisfies formula (2) at a given position (x, y). Thus, the first corrected reference image data satisfies formula (2) at at least nine representative positions $(x_1, y_1)$ to $(x_9, y_9)$. Accordingly, by applying formula (2) with respect to the nine representative positions $(x_1, y_1)$ to $(x_9, y_9)$, the following linear equations (5) and (6) are obtained:

$$D_x = ZC_{dx} \Leftrightarrow \begin{pmatrix} d_{x1} \\ d_{x2} \\ \vdots \\ d_{x9} \end{pmatrix} = \begin{pmatrix} x_1^2 & x_1 y_1 & y_1^2 & x_1 & y_1 & 1 \\ x_2^2 & x_2 y_2 & y_2^2 & x_2 & y_2 & 1 \\ \cdots & \cdots & \cdots & \cdots & \cdots & \cdots \\ x_9^2 & x_9 y_9 & y_9^2 & x_9 & y_9 & 1 \end{pmatrix} \begin{pmatrix} c_{dx1} \\ c_{dx2} \\ \vdots \\ c_{dx6} \end{pmatrix} \quad (5)$$

$$D_y = ZC_{dy} \Leftrightarrow \begin{pmatrix} d_{y1} \\ d_{y2} \\ \vdots \\ d_{y9} \end{pmatrix} = \begin{pmatrix} x_1^2 & x_1 y_1 & y_1^2 & x_1 & y_1 & 1 \\ x_2^2 & x_2 y_2 & y_2^2 & x_2 & y_2 & 1 \\ \cdots & \cdots & \cdots & \cdots & \cdots & \cdots \\ x_9^2 & x_9 y_9 & y_9^2 & x_9 & y_9 & 1 \end{pmatrix} \begin{pmatrix} c_{dy1} \\ c_{dy2} \\ \vdots \\ c_{dy6} \end{pmatrix} \quad (6)$$

In addition, in the first embodiment, the reliability w is taken into consideration for each partial region. Assuming that the reliability w is independently set for each of the partial regions R1 to R9, as described above, the reliability matrices $W_x$ and $W_y$ as shown by the following formulae (7) and (8) are obtained.

$$W_x = \begin{pmatrix} w_{x1} & 0 & 0 & 0 & 0 & 0 \\ 0 & w_{x2} & 0 & 0 & 0 & 0 \\ \ldots & \ldots & \ldots & \ldots & \ldots & \ldots \\ 0 & 0 & 0 & 0 & 0 & w_{x9} \end{pmatrix} \quad (7)$$

$$W_y = \begin{pmatrix} w_{y1} & 0 & 0 & 0 & 0 & 0 \\ 0 & w_{y2} & 0 & 0 & 0 & 0 \\ \ldots & \ldots & \ldots & \ldots & \ldots & \ldots \\ 0 & 0 & 0 & 0 & 0 & w_{y9} \end{pmatrix} \quad (8)$$

Here, the reliability matrices $W_x$ and $W_y$, a matrix Z based on coordinates $(x_1, y_1)$ to $(x_9, y_9)$ of representative positions, and vectors $D_x$ and $D_y$ including distortion amounts $d_{x1}$ to $d_{x9}$ and $d_{y1}$ to $d_{y9}$ are determined as concrete numerical values. Accordingly, the distortion amount estimation section 503 is capable of estimating distortion amount vectors $C_{dx}$ and $C_{dy}$ by executing a computation by the least squares method on the above formulae (5) to (8) as shown in the following formula (9):

$$C_{dx} = (Z^T W_x Z)^{-1} Z^T W_x D_x$$

$$C_{dy} = (Z^T W_y Z)^{-1} Z^T W_y D_y \quad (9)$$

In estimation, in order to obtain a least squares solution in an overdetermined system, it is desirable that a number M of the partial regions be greater than an element number of the distortion amount vector $C_d$ (six in the examples of formulae (5) and (6)). More preferably, if a square root $m(m^2=M)$ of the number M of partial regions is determined, it is desirable that a polynomial that configures the distortion amount vector $C_d$ be a polynomial of degree (m−1) or lower.

However, when the number of partial regions with a significantly dense circuit pattern (i.e., with a high reliability w) is small, the least squares solution will be obtained in an underdetermined system, and the solution may not be uniquely determined. In this case, the distortion amount estimation section 503 may perform, for example, L1 regularization or L2 regularization, and estimate a distortion amount vector $C_d$. Examples of L1 regularization that can be applied include ridge regression, and examples of L2 regularization that can be applied include LASSO regression; however, L1 regularization and L2 regularization are not limited thereto.

1.3 Advantageous Effects of Present Embodiment

According to the first embodiment, it is possible to suppress erroneous detection of a defect in an image even when there is a region with a sparse circuit pattern. This effect will be described below.

The reliability-weighted local shift amount estimation section 502 performs SSD matching between the partial region of the first corrected reference image data obtained by applying the global shift amount S1 to the reference image data and a partial region of the image-to-be-inspected data, and estimates a local shift amount S2 of each partial region. In general, the distortion amount d is a shift amount that is not linearly distributed according to the position of the image data (namely, non-linear). However, the distortion amount d may be locally regarded as being linearly distributed according to the position of the image data. Thereby, the distortion amount estimation section 503 regards the local shift amount S2 estimated at the partial region of the image data as a representative distortion amount (namely, a distortion amount at a representative position) in the partial region, and estimates a distortion amount vector $C_d$ by which amounts of position gaps of all the pixels can be expressed.

Also, the reliability-weighted local shift amount estimation section 502 further estimates a reliability w of the estimated local shift amount S2 according to the presence or absence of a circuit pattern in the partial region. This allows the distortion amount estimation section 503 to estimate, using formula (9), the distortion amount vector $C_d$ by putting emphasis on the local shift amount S2 of a partial region with a dense circuit pattern, hardly taking into consideration a local shift amount S2 of a partial region with a sparse circuit pattern.

In addition, as described with reference to FIG. 9, in a partial region with a sparse circuit pattern, the amount of change of the SSD value is small in the vicinity of the true shift amount $(s_x, s_y)$, compared to a partial region with a dense circuit pattern. Also, since the luminance of a region with no circuit pattern contains much noise, there is a relatively high probability that the local shift amount S2 is not accurately estimated. Accordingly, it is not preferable to treat equally a local shift amount S2 of a partial region with a sparse circuit pattern and a local shift amount S2 of a partial region with a dense circuit pattern, since an error contained in the local shift amount S2 of a partial region with a sparse circuit pattern might affect the value of the distortion amount vector $C_d$ by the distortion amount estimation section 503.

According to the first embodiment, the distortion amount estimation section 503 estimates a distortion amount vector $C_d$ using the weighted least squares method based on the reliability w. It is thereby possible to estimate the distortion amount vector $C_d$, taking into consideration the local shift amount S2 with high estimation precision, even when the local shift amount S2 with low estimation precision is included. Accordingly, it is possible to suppress erroneous detection of defects in an image even when there is a region with a sparse circuit pattern.

1.4 Modification of First Embodiment

In the first embodiment, the reliability-weighted local shift amount estimation section 502 approximates an amount of change of an SSD value in the vicinity of a shift amount $(s_x, s_y)$ that minimizes the SSD value by a quadratic function, and estimates the reliability w based on the quadratic coefficient of the quadratic function; however, the configuration is not limited thereto. The reliability-weighted local shift amount estimation section 502 may estimate the reliability w by, for example, obtaining amounts of change in luminance of adjacent pixels for each partial region and evaluating the magnitude of the sum of squares (or sum of absolute values) of the amounts of change.

Figure 11:
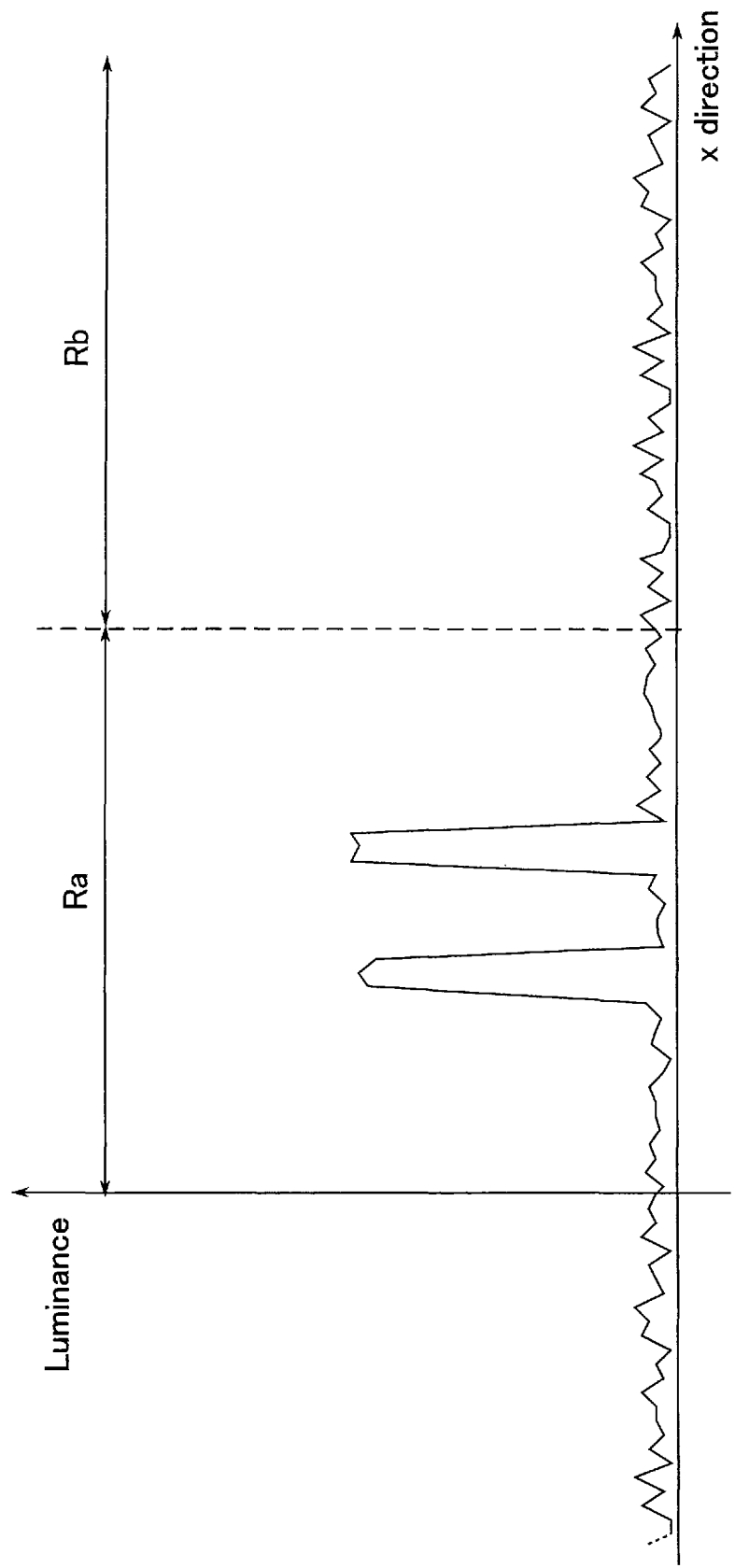
FIG. 11 is a diagram illustrating a reliability estimation operation in a defect detection device of the inspection apparatus according to a modification of the first embodiment.

FIG. 11 is a diagram illustrating a reliability estimation operation in a defect detection device according to a modification of the first embodiment. In FIG. 11, a change in luminance of the image-to-be-inspected data 523 along line XI-XI of FIG. 8 is shown.

In the partial region Ra, two circuit patterns that extend along the y direction intersect the XI-XI line. Accordingly, as shown in FIG. 11, two portions in which the luminance is higher than that of the other portions are generated in the partial region Ra as viewed in the x direction. On the other hand, in the partial region Rb, there is no circuit pattern that intersects the line XI-XI. Thus, the luminance in the partial region Rb appears only as a noise component as viewed in the x direction.

In this manner, in the partial region with a circuit pattern, a change in luminance appears conspicuously, compared to a partial region with no circuit pattern. Accordingly, the reliability-weighted local shift amount estimation section 502 may estimate the reliability w by obtaining amounts of change in luminance of adjacent pixels for each partial region and evaluating the sum of squares (or sum of absolute values) of the amounts of change. It is thereby possible, according to the modification of the first embodiment, too, to associate the reliability w according to the presence or absence of the circuit pattern with a local shift amount S2, thereby suppressing the effects of errors in the partial region with a sparse circuit pattern. Accordingly, an advantageous effect similar to that of the first embodiment can be achieved.

2. Second Embodiment

Next, an inspection apparatus according to a second embodiment will be described.

In the first embodiment, a case has been described where the reliability w is estimated by normalizing, across the partial regions, evaluation values of the respective partial regions; however, the configuration is not limited thereto. In the second embodiment, a reliability w' is reset which makes the difference in reliability between a partial region regarded as including a circuit pattern and a partial region regarded as not including a circuit pattern extremely large, based on the estimated reliability w. Hereinafter, a description of configurations and operations that are the same as those of the first embodiment will be omitted, and configurations and operations different from those of the first embodiment will be mainly described.

2.1 Reliability Estimation Operation

A reliability estimation operation in a defect detection device according to a second embodiment will be described.

First, the reliability-weighted local shift amount estimation section 502 calculates a shift of an SSD value with respect to the shift amount for each partial region, and approximates the shift by a quadratic function with respect to each of the x and y directions, similarly to the first embodiment. The reliability-weighted local shift amount estimation section 502 extracts a quadratic coefficient of a quadratic function for each partial region, and normalizes the value of the quadratic coefficient in such a manner that the reliability of a partial region at which the quadratic coefficient is maximized becomes 1. Thereby, the reliability w is estimated.

Moreover, the reliability-weighted local shift amount estimation section 502 determines whether or not the estimated reliability w is equal to or greater than a threshold value θ. If the reliability w is equal to or greater than the threshold value θ (w≥θ), the reliability-weighted local shift amount estimation section 502 assumes that a circuit pattern is present in the partial region corresponding to the reliability w, and resets a predetermined constant C1 as a reliability w' (w'=c1). If the reliability w is equal to or greater than the threshold value θ (w<θ), the reliability-weighted local shift amount estimation section 502 assumes that a circuit pattern is not present in the partial region corresponding to the reliability w, and resets a predetermined constant C2 to be smaller than the constant C1 as a reliability w' (w'=C2).

Figure 12:
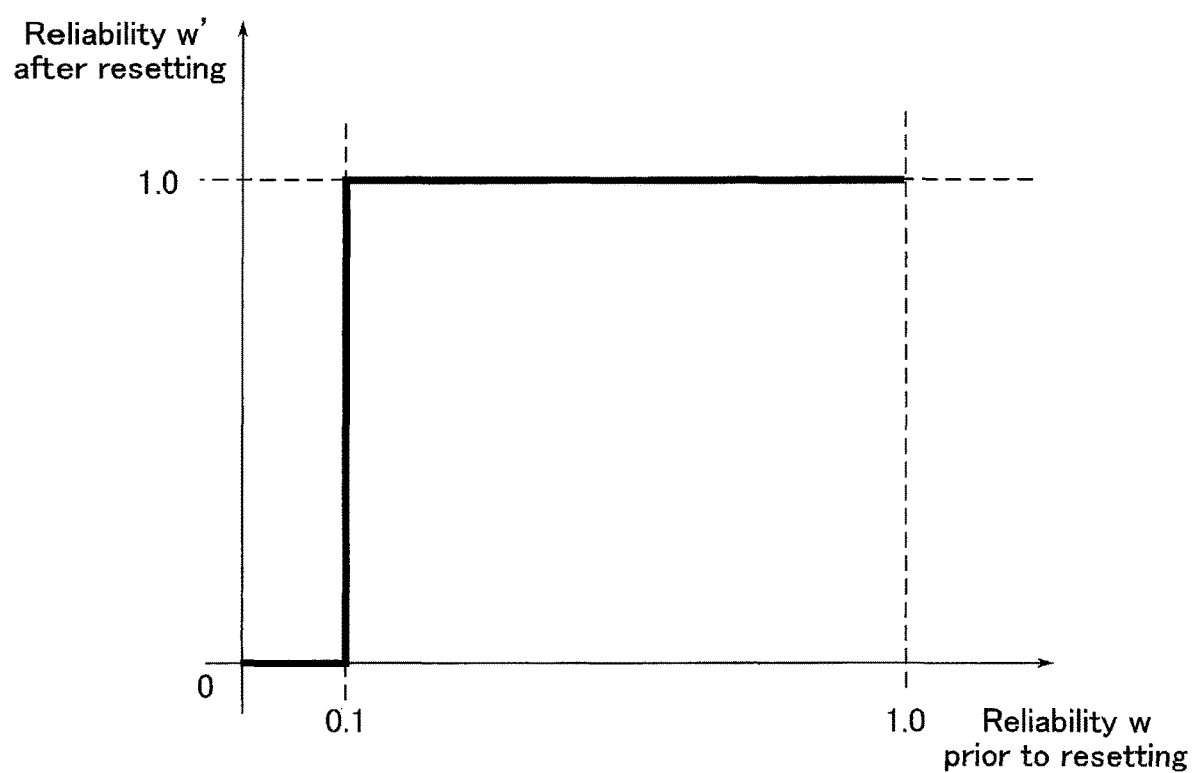
FIG. 12 is a diagram illustrating an example of a reliability estimation operation in a defect detection device of an inspection apparatus according to a second embodiment.

FIG. 12 is a diagram illustrating a reliability estimation operation in a defect detection device according to the second embodiment. In FIG. 12, the threshold value θ and the constants C1 and C2 are 0.1, 1.0, and 0.0, respectively.

As shown in FIG. 12, the reliability w' after resetting can take an extremely large value in a partial region regarded as including a circuit pattern, and can take an extremely small value in a partial region regarded as not including a circuit pattern. It is thereby possible to estimate a distortion amount vector $C_d$ using only information on a partial region that substantially includes a circuit pattern.

Accordingly, according to the second embodiment, an estimated error of the distortion amount vector $C_d$ caused by a partial region regarded as not including a circuit pattern can be substantially eliminated.

2.2 Modification of Second Embodiment

In the second embodiment, a case has been described where the reliability w' after resetting discretely changes from the constant C1 to C2, using the threshold value θ as a boundary; however, the configuration is not limited thereto. The reliability w' after resetting may be set, for example, to continuously change in the vicinity of the threshold value θ.

The reliability-weighted local shift amount estimation section 502 may, for example, calculate the reliability w' by applying the following formula (10) including the threshold value θ and a given constant α to the estimated reliability w.

$$w' = \frac{1}{\pi}\left\{\operatorname{atan}[\alpha\pi(w-\theta)] + \frac{\pi}{2}\right\} \tag{10}$$

Figure 13:
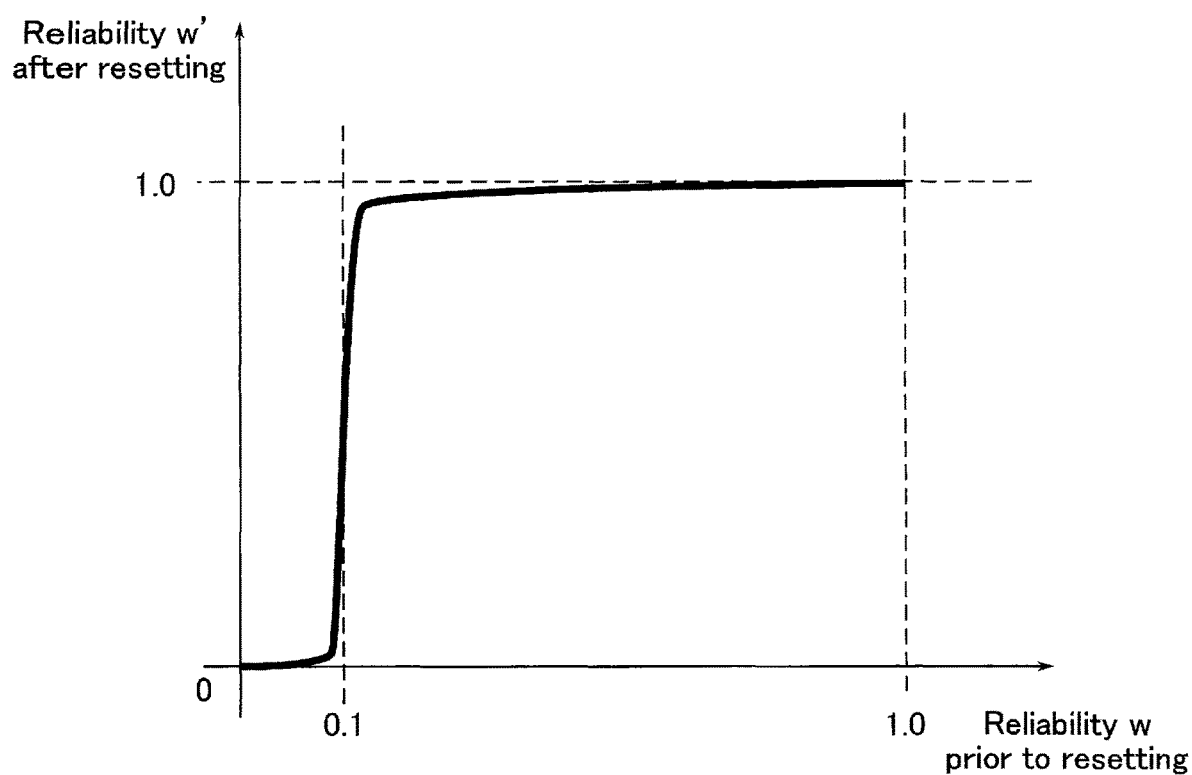
FIG. 13 is a diagram illustrating an example of a reliability estimation operation in a defect detection device of an inspection apparatus according to a modification of the second embodiment.

FIG. 13 is a diagram illustrating a reliability estimation operation in a defect detection device according to a modification of the second embodiment. FIG. 13 shows a case where the threshold value θ is 0.1.

As shown in FIG. 13, the reliability w' after resetting takes an extremely large value in a partial region regarded as including a circuit pattern, takes an extremely small value in a partial region regarded as not including a circuit pattern, and continuously changes in the vicinity of the threshold value A. It is thereby possible to estimate a distortion amount vector $C_d$ that continuously changes the distortion amount of the entire image.

3. Third Embodiment

An inspection apparatus according to a third embodiment will be described.

In the first and second embodiments, a case has been described where, when a reliability w corresponding to a partial region is estimated, the reliability w is estimated without using information on a partial region other than said partial region; however, the configuration is not limited thereto. In the third embodiment, a reliability w' of a partial region regarded as not including a circuit pattern is reset based on information on a partial region regarded as including a circuit pattern. Hereinafter, a description of configurations and operations that are the same as those of the second embodiment will be omitted, and configurations and operations different from those of the second embodiment will be mainly described.

3.1 Reliability Estimation Operation

A reliability estimation operation in a defect detection device according to a third embodiment will be described.

The reliability-weighted local shift amount estimation section 502 estimates a reliability w, and then determines whether or not the reliability w is equal to or greater than the threshold value θ, similarly to the second embodiment. If the reliability w is equal to or greater than the threshold value θ (w≥θ), the reliability-weighted local shift amount estimation section 502 assumes that a circuit pattern is present in the partial region corresponding to the reliability w, and resets a predetermined constant C1 as a reliability w' ('=c1).

If the reliability w is less than the threshold value θ (w<θ), the reliability-weighted local shift amount estimation section 502 assumes that a circuit pattern is not present in the partial region corresponding to the reliability w, and applies the following formula (11):

$$w' = \frac{\sum_{k \in Reliable\ Area}\left[C1\ \exp\left(-\frac{l^2}{2\sigma^2}\right)\right]}{\sum_{k \in All}\left[C1\exp\left(-\frac{l^2}{2\sigma^2}\right)\right]} \quad (11)$$

Here, L indicates a distance from a partial region targeted for reliability estimation, assuming that the distance between adjacent partial regions is 1, and 5 is a given constant value.

It is thereby possible to estimate the reliability w' of a partial region regarded as not including a circuit pattern by a reliability (W'=C1) of a partial region of a periphery regarded as including a circuit pattern and a Gaussian weighted mean based on a distance to the partial region of said periphery.

Figure 14:
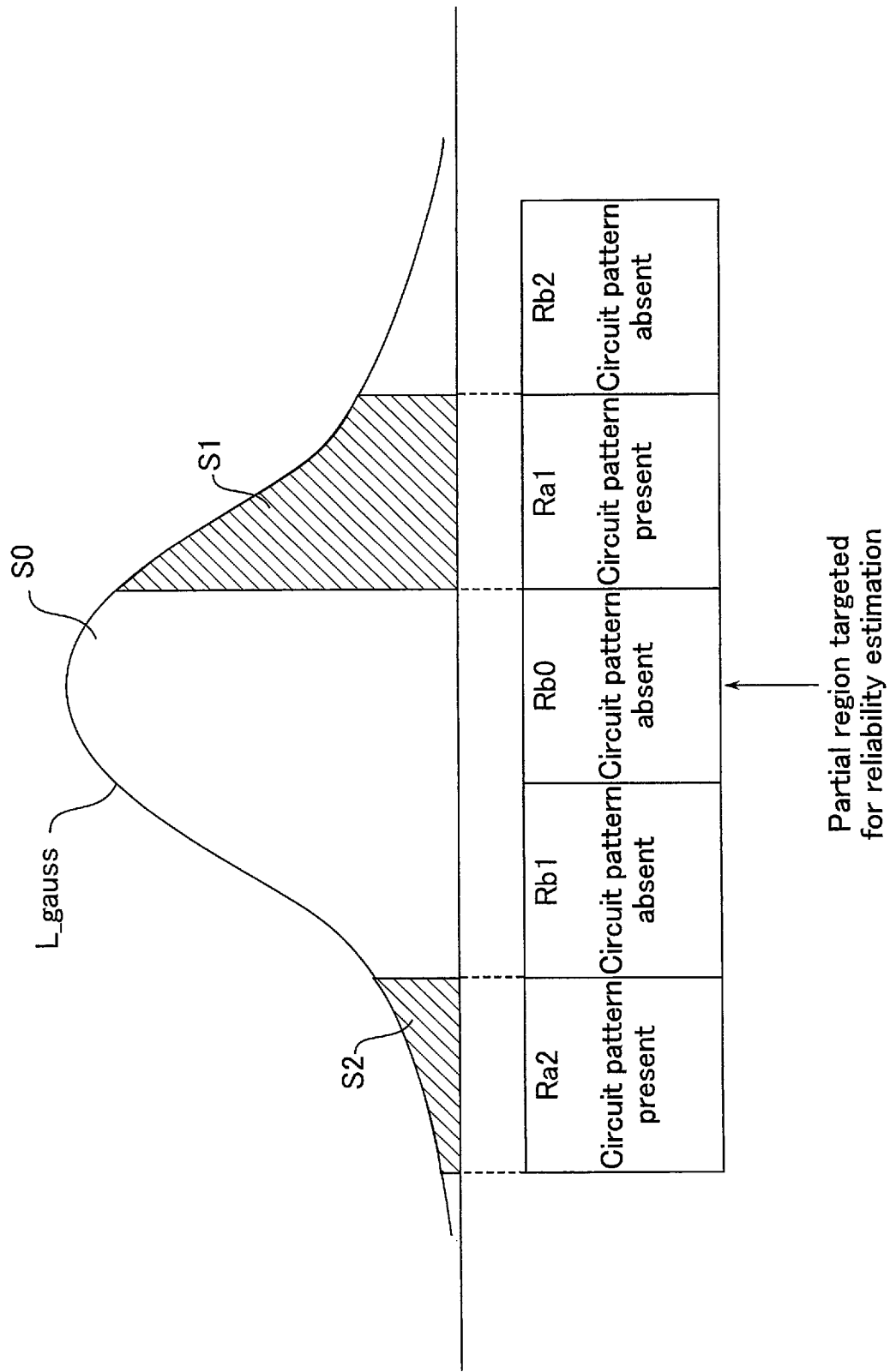
FIG. 14 is a diagram illustrating an example of a reliability estimation operation in a defect detection device of an inspection apparatus according to a modification of a third embodiment.

FIG. 14 is a diagram illustrating a reliability estimation operation in a defect detection device according to the third embodiment. In FIG. 14, five partial regions Ra2, Rb1, Rb0, Ra1, and Rb2 arranged in a certain direction and a Gaussian distribution L_gauss for estimating the reliability w' of, of the five partial regions, the partial region Rb0 regarded as not including a circuit pattern are schematically shown.

If the partial regions Ra1 and Ra2 are regarded as including a circuit pattern and the partial regions Rb0, Rb1, and Rb2 are regarded as not including a circuit pattern, as shown in FIG. 14, the reliability w' of the partial region Rb0 is expressed as w'=(S1+S2)/S0. Here, S0 denotes an area S0 of the entire Gauss distribution L_gauss, and S1 and S2 respectively denote areas of portions corresponding to the partial regions Ra1 and Ra2 each regarded as including a circuit pattern.

In the above-described example, a case has been described where a normal distribution is used as a probability density function; however, the distribution is not limited to a normal distribution, and a distribution in a given shape is applicable to a function that attenuates according to a distance from a partial region targeted for reliability estimation.

According to the third embodiment, the reliability-weighted local shift amount estimation section 502 estimates a reliability of a partial region regarded as not including a circuit pattern based on a reliability of a partial region regarded as including a circuit pattern and a distance to the partial region regarded as including the circuit pattern. Thereby, in estimation of a distortion amount vector $C_d$, a local shift amount S2 of a partial region farther from the partial region regarded as including a circuit pattern is given a lower weight. It is thereby possible to smoothly set the reliability between adjacent partial regions, while eliminating information on a partial region with a sparse circuit pattern. It is thereby possible to estimate a distortion amount vector $C_d$ that smoothly changes the distortion amount between adjacent pixels.

4. Others

The above-described first to third embodiments can be modified in various manners.

For example, in the above-described first to third embodiments, a case has been described where an SEM is applied as the real image data generation device 10; however, the configuration is not limited thereto. For example, an optical scanner capable of generating, as real image data, an optical image (transmitted light image and/or a reflected optical image) of a mask used in a semiconductor device may be applied as the real image data generation device 10.

FIG. 15 is a schematic diagram illustrating a hardware configuration of a real image data generation device according to a modification.

As shown in FIG. 15, the real image data generation device 10 may comprise a light source 111, a plurality of half mirrors 112, 113, 114, 115, 116, and 117, a plurality of objective lenses 118, 119, and 120, a stage 121, a transmitted light sensor 122, and a reflected light sensor 123.

In this case, the light source 111 is, for example, a laser light source capable of emitting ultraviolet laser light. The laser light emitted from the light source 111 is applied to a mask 124 mounted on the stage 121 via the half mirrors 112 to 117 and the objective lenses 118 and 119. For example, the half mirrors 112 to 115 and the objective lens 118 configure a translucent optical system, and the half mirrors 112, 116, and 117 and the objective lens 119 configure a reflective optical system. It is thereby possible to illuminate the mask 124 from above and below, and the transmitted light and the reflected light of the mask 124 are respectively input to the transmitted light sensor 122 and the reflected light sensor 123 via the objective lens 120. The transmitted light sensor 122 and the reflected light sensor 123 detect transmitted light and reflected light, respectively, of the mask 124. The real image data generation device 10 processes the detected transmitted light and reflected light in an unillustrated processor, and generates real image data of the mask 124. The generated real image data is transmitted to the defect detection device 50.

With the above-described configuration, it is possible to perform a defect detection process even when an optical image is generated as real image data. It is thereby possible to obtain an advantageous effect similar to those of the first to third embodiments even when the optical image data generated by an optical scanner is input to the defect detection device 50.

In the first and second embodiments, a case has been described where the reference image data 522 is corrected; however, the configuration is not limited thereto, and the image-to-be-inspected data 523 may be corrected.

In the above-described first and second embodiments, a case has been described where the global shift amount S1 is estimated by the global shift amount estimation section 501; however, this operation may be omitted. In this case, the global shift amount S1 is substantially replaced with non-dimensional coefficients ($C_{dx6}$ and $C_{dy6}$) of the distortion amount vector $C_d$.

In the above-described first and second embodiments, a case has been described where the control unit 51 of the defect detection device 50 operates by a CPU; however, the configuration is not limited thereto. For example, the control unit 51 may be configured to include a dedicated circuit (dedicated processor) configured of one or more GPUs, ASICs, FPGAs, etc. By the dedicated processor, the control unit 51 is capable of implementing functions by the global shift amount estimation section 501, the reliability-weighted local shift amount estimation section 502, the distortion amount estimation section 503, the correction section 504, and the comparison section 505.

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit.

What is claimed is:

1. An inspection apparatus comprising:
an image generation device which generates a second image corresponding to a first image; and
a defect detection device which detects a defect in the second image with respect to the first image, wherein
each of the first image and the second image includes a plurality of partial regions each including a plurality of pixels, and
the defect detection device is configured to:
estimate a first value indicating a position difference between the first image and the second image for each of the partial regions, based on a luminance difference between the first image and the second image;
estimate a second value indicating a reliability of the first value for each of the partial regions; and
estimate a position difference between the first image and the second image for each of the pixels, based on the first value and the second value estimated for each of the partial regions,
wherein
the partial regions include a first partial region including a circuit pattern and a second partial region not including a circuit pattern, and
the second value of the first partial region is greater than the second value of the second partial region.

2. The apparatus of claim 1, wherein
the second value of the first partial region is a constant.

3. The apparatus of claim 2, wherein
the second value of the second partial region is a constant.

4. The apparatus of claim 2, wherein
the second value of the second partial region is estimated based on the second value of the first partial region and a distance from the first partial region.

5. The apparatus of claim 1, wherein
the defect detection device estimates, for each of the partial regions, a position difference that minimizes a value of a sum of squared differences (SSD) between the first image and the second image.

6. The apparatus of claim 5, wherein
the defect detection device estimates, for each of the partial regions, the second value based on an amount of change of the value of SSD in a range including the first value.

7. The apparatus of claim 5, wherein
the defect detection device estimates, for each of the partial regions, the second value based on a sum of amounts of change of luminances of adjacent pixels.

8. The apparatus of claim 1, wherein
a first pixel of the first image and a second pixel of the second image corresponding to the first pixel are associated by a position-related function of degree 2 or higher.

9. The apparatus of claim 1, wherein
the image generation device includes an optical scanner or a scanning electron microscope.

10. An inspection method executed by an inspection apparatus including: an image generation device which generates a second image corresponding to a first image; and a defect detection device which detects a defect in the second image with respect to the first image, each of the first image and the second image including a plurality of partial regions each including a plurality of pixels, the method comprising:
estimating a first value indicating a position difference between the first image and the second image for each of the partial regions, based on a luminance difference between the first image and the second image;
estimating a second value indicating a reliability of the first value for each of the partial regions; and
estimating a position difference between the first image and the second image for each of the pixels, based on the first value and the second value estimated for each of the partial regions,
wherein
the partial regions include a first partial region including a circuit pattern and a second partial region not including a circuit pattern, and
the second value of the first partial region is greater than the second value of the second partial region.

11. The method of claim 10, wherein
the second value of the first partial region is a constant.

12. The method of claim 11, wherein
the second value of the second partial region is a constant.

13. The method of claim 11, wherein
the second value of the second partial region is estimated based on the second value of the first partial region and a distance from the first partial region.

14. A non-transitory computer-readable medium storing thereon a program used in an inspection apparatus including: an image generation device which generates a second image corresponding to a first image; and a defect detection device which detects a defect in the second image with respect to the first image, each of the first image and the second image including a plurality of partial regions each including a plurality of pixels,
the program causing a processor of the defect detection device to:
estimate a first value indicating a position difference between the first image and the second image for each of the partial regions, based on a luminance difference between the first image and the second image;
estimate a second value indicating a reliability of the first value for each of the partial regions; and
estimate a position difference between the first image and the second image for each of the pixels, based on the first value and the second value estimated for each of the partial regions,
wherein
the partial regions include a first partial region including a circuit pattern and a second partial region not including a circuit pattern, and
the second value of the first partial region is greater than the second value of the second partial region.

15. The storage medium of claim 14, wherein
the second value of the first partial region is a constant.

16. The storage medium of claim 15, wherein
the second value of the second partial region is a constant.

17. The storage medium of claim 15, wherein
the second value of the second partial region is estimated based on the second value of the first partial region and a distance from the first partial region.

* * * * *